United States Patent
Li et al.

(10) Patent No.: US 12,523,483 B2
(45) Date of Patent: Jan. 13, 2026

(54) METHOD AND DEVICE FOR ACQUIRING POINT OF INTEREST REPRESENTATION INFORMATION, AND METHOD FOR TRAINING SPATIAL RELATIONSHIP PERCEPTION MODEL FOR POINTS OF INTEREST

(71) Applicant: BEIJING BAIDU NETCOM SCIENCE TECHNOLOGY CO., LTD., Beijing (CN)

(72) Inventors: Shuangli Li, Beijing (CN); Fan Wang, Beijing (CN); Jingbo Zhou, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 106 days.

(21) Appl. No.: 18/519,395

(22) Filed: Nov. 27, 2023

(65) Prior Publication Data
US 2024/0094018 A1   Mar. 21, 2024

(30) Foreign Application Priority Data
Jun. 30, 2023   (CN) .......................... 202310796783.8

(51) Int. Cl.
*G01C 21/34* (2006.01)
*G01C 21/36* (2006.01)
*G06F 18/25* (2023.01)

(52) U.S. Cl.
CPC ..... *G01C 21/3476* (2013.01); *G01C 21/3682* (2013.01); *G06F 18/251* (2023.01)

(58) Field of Classification Search
CPC .......... G01C 21/3476; G01C 21/3682; G06F 18/251; G06F 16/9537; G06F 16/29; G06N 5/01
See application file for complete search history.

(56) References Cited

U.S. PATENT DOCUMENTS

| | | | |
|---|---|---|---|
| 11,601,552 B2* | 3/2023 | Scodary | H04M 3/5175 |
| 2015/0187107 A1* | 7/2015 | Vander Mey | G06Q 50/01 345/629 |
| 2022/0075808 A1* | 3/2022 | Li | G06F 16/9536 |
| 2024/0233195 A1* | 7/2024 | Wang | G06T 17/00 |

FOREIGN PATENT DOCUMENTS

| | | | | |
|---|---|---|---|---|
| CN | 106940186 A | * | 7/2017 | .......... G01C 21/206 |
| CN | 114528479 A | * | 5/2022 | ......... G06F 16/9537 |
| WO | WO-2020166356 A1 | * | 8/2020 | ............. H04N 23/60 |
| WO | WO-2022087751 A1 | * | 5/2022 | ............. G06V 10/82 |

* cited by examiner

*Primary Examiner* — Rami Khatib
(74) *Attorney, Agent, or Firm* — Osha Bergman Watanabe & Burton LLP

(57) ABSTRACT

A method for acquiring point of interest (POI) representation information, includes: acquiring a POI relationship graph, and acquiring a node relationship set of each node on the POI relationship graph based on the POI relationship graph, in which the POI relationship graph includes edges representing relationships between nodes of POIs, and the node relationship set includes relationship paths where the node reaches all second-order neighbor nodes via any one first-order neighbor node; acquiring a spatial distance matrix between the node and corresponding second-order neighbor nodes; and determining first POI representation information of the node based on the node relationship set of the node and the spatial distance matrix.

12 Claims, 9 Drawing Sheets

METHOD AND DEVICE FOR ACQUIRING POINT OF INTEREST REPRESENTATION INFORMATION, AND METHOD FOR TRAINING SPATIAL RELATIONSHIP PERCEPTION MODEL FOR POINTS OF INTEREST

CROSS-REFERENCE TO RELATED APPLICATIONS

This Application claims the benefit of priority to Chinese Patent Application No. 202310796783.8, filed on Jun. 30, 2023, the contents of which are incorporated herein by reference in their entireties for all purposes.

TECHNICAL FIELD

The present disclosure relates to a field of data processing technologies, specifically to fields of artificial intelligence (AI), deep learning, information mining and autonomous driving, and particularly to a method and a device for acquiring point of interest (POI) representation information, and a method and a device for training a spatial relationship perception model for points of interest (POIs).

BACKGROUND

Point of interests (POI) on the map are basic requirements of daily travel of resident users, and have a large commercial value. The POIs on the map can provide comprehensive position information for cities and users, and are convenient for better management and planning of travel requirements.

Currently, for determination of learning and acquiring POI representation information, relative distances between neighbor nodes are directly fused, which easily results in information loss, and ignores a complex relationship between POIs, and mines the POI representation information insufficiently.

SUMMARY

According to a first aspect of the disclosure, a method for acquiring point of interest (POI) representation information is provided. The method includes: acquiring a POI relationship graph, and acquiring a node relationship set of each node on the POI relationship graph based on the POI relationship graph, in which the POI relationship graph includes edges representing relationships between nodes of POIs, and the node relationship set includes relationship paths where the node reaches all second-order neighbor nodes via any one first-order neighbor node; acquiring a spatial distance matrix between the node and corresponding second-order neighbor nodes; and determining first POI representation information of the node based on the node relationship set of the node and the spatial distance matrix.

According to a second aspect of the disclosure, a method for training a spatial relationship perception model for points of interest (POIs) is provided. The method includes: acquiring a sample POI relationship graph, and acquiring a sample node relationship set of each sample node on the sample POI relationship graph based on the sample POI relationship graph, in which the sample POI relationship graph includes edges representing relationships between sample nodes of the POIs, and the sample node relationship set includes relationship paths where the sample node reaches all second-order neighbor nodes via any one first-order neighbor node; acquiring a sample spatial distance matrix between the sample node and corresponding second-order neighbor nodes; determining first sample POI representation information of the sample node by training an initial spatial relationship perception model based on the sample node relationship set of the sample node and the sample spatial distance matrix; and obtaining downstream task prediction data of the sample node based on the first sample POI representation information, and obtaining a target spatial relationship perception model by correcting the spatial relationship perception model based on the downstream task prediction data and downstream task labeling data of the sample node until training is completed.

According to a third aspect of the present disclosure, a device for acquiring point of interest (POI) representation information is provided. The device includes: at least one processor; and a memory communicatively connected to the at least one processor and stored with instructions executable by the at least one processor. The at least one processor is configured to: acquire a POI relationship graph, and acquire a node relationship set of each node on the POI relationship graph based on the POI relationship graph, in which the POI relationship graph includes edges representing relationships between nodes of POIs, and the node relationship set includes relationship paths where the node reaches all second-order neighbor nodes via any one first-order neighbor node; acquire a spatial distance matrix between the node and corresponding second-order neighbor nodes; and determine first POI representation information of the node based on the node relationship set of the node and the spatial distance matrix.

It should be understood that, the content described in the part is not intended to identify key or important features of embodiments of the present disclosure, nor intended to limit the scope of the present disclosure. Other features of the present disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

Embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

Data processing is collection, storage, retrieval, processing, conversion and transmission of data. It is designed to extract and deduce valuable and meaningful data for certain specific people from a large number of data that may be disorganized and difficult to understand.

Artificial Intelligence, abbreviated as AI, is a new science of technology that studies and develops theories, methods, technologies and application systems configured to simulate, extend and expand human intelligence. It attempts to understand the nature of intelligence and to produce a new intelligent machine that may react in a similar way to human intelligence, researches in the field including robots, speech recognition, image recognition, natural language processing, and expert systems.

Deep learning (DL), is a new research direction in the field of machine learning (ML). DL learns inherent law and representation hierarchy of sample data, and information obtained in the learning process is of great help in interpretation of data such as words, images and sound. Its final goal is that the machine may have analytic learning ability like humans, which may recognize data such as words, images, sound, etc.

Information mining is to obtain intrinsic features among data objects on the basis of a large number of samples and perform a purposeful information extraction based on the intrinsic features. It is a process of analyzing information resources by using an information technology, and extracting unknown and complete information from various information sources for key service decision-making. Information mining includes data mining and text mining.

Autonomous driving, generally referred to as an autonomous driving system, achieves real-time and continuous control of a train by advanced communication, computer, network and control technologies. Modern communication means is adopted to directly face the train, which may achieve bidirectional data communication between the train and the ground, with a high transmission rate and a large information amount, and may timely obtain an exact position of a front train by following up the train and the control center, so that operation management is more flexible, control is more effective, and it is more suitable for autonomous driving requirements of the train.

Figure 1:
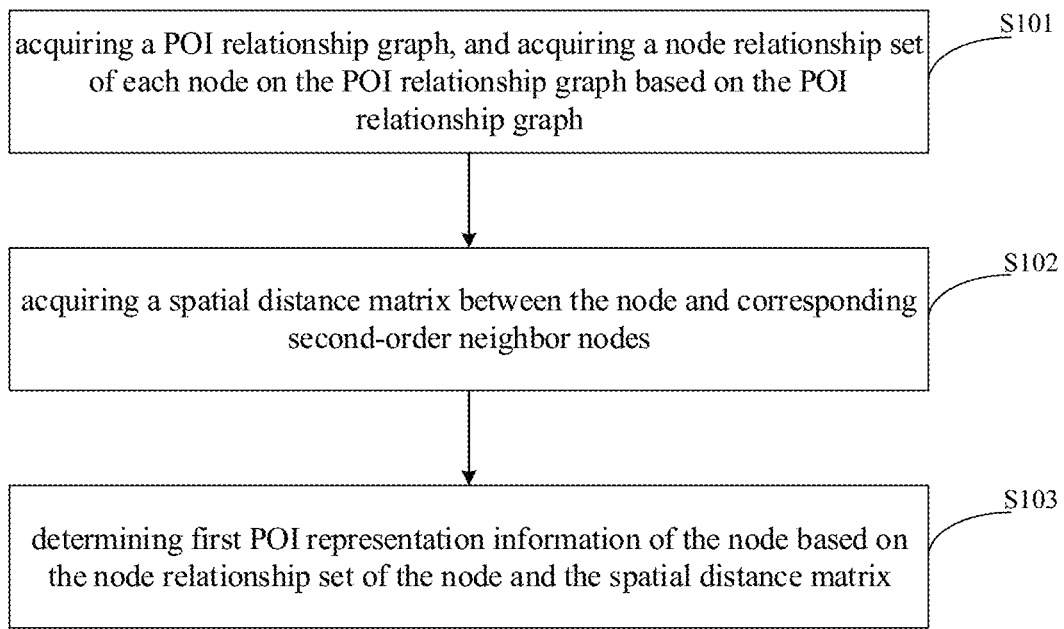
FIG. 1 is a diagram illustrating a method for acquiring point of interest (POI) representation information provided in embodiments of the present disclosure.

FIG. 1 is a diagram illustrating a method for acquiring point of interest (POI) representation information provided in embodiments of the present disclosure. As illustrated in FIG. 1, the method includes but not limited to the following steps.

At S101, a POI relationship graph is acquired, and a node relationship set of each node on the POI relationship graph is acquired based on the POI relationship graph.

The POI relationship graph includes edges representing relationships between nodes of POIs, and the node relationship set includes relationship paths where the node reaches all second-order neighbor nodes via any one first-order neighbor node.

Figure 1A:
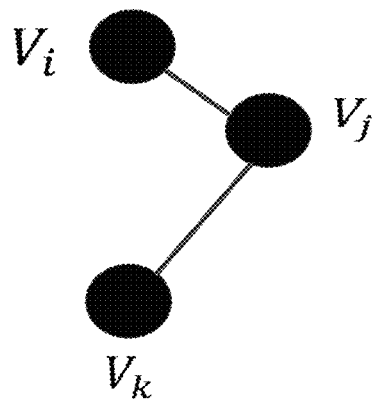
FIG. 1a is a diagram illustrating a node relationship provided in embodiments of the present disclosure.

The first-order neighbor node is a node directly adjacent to the node, and the second-order neighbor node is a node connected via the first-order neighbor node, and the second-order neighbor node is adjacent to the first-order neighbor node. As illustrated in FIG. 1a, a first-order neighbor node of a node $V_i$ is a node $V_j$, and a second-order neighbor node of the node $V_i$ is a node $V_k$.

Embodiments of the disclosure aim to acquire accurate POI representation information of each POI node; more accurate POI representation information may be suitable for more scenarios, such as recommending the travel of the user, capturing high-value clients for enterprises and providing accurate online promotion for merchants.

In an embodiment, a POI relationship graph may be determined based on an existing map. The POI relationship graph includes different nodes and relationships between the nodes. The nodes in the POI relationship graph represent different POIs, and when a certain relationship between the nodes, corresponding nodes may be connected, that is, the POI relationship graph includes edges representing relationships between the nodes of the POIs.

In some implementations, when there are completive, complementary, and dependency relationships between POIs, it is deemed that there is a relationship between POI nodes.

In another implementations, when the POI nodes are frequently accessed by common users, it is deemed that there is a relationship between the POI nodes. For example, when a number of times for which certain two POI nodes are continuously accessed by a common user exceeds a certain number, the two POI nodes are deemed to be frequently accessed by the common user, that is, it is deemed that there is a relationship between the two POI nodes.

Further, a node relationship set of each node on the POI relationship graph is determined; and the node relationship set includes all relationships between the nodes and all relationship paths. In an embodiment, the relationship path is a path where the node reaches all second-order neighbor nodes via the first-order neighbor nodes.

As an example, assuming that there is a competitive relationship between a current node $V_i$ and a node $V_j$, and there is a competitive relationship between the node $V_j$ and the node $V_k$, it may be assumed that there may be a competitive relationship between the node $V_i$ and the node $V_k$, in which case, the node $V_j$ is taken as a first-order neighbor node of the node $V_i$, the node $V_k$ is taken as a second-order neighbor node of the node $V_i$, and a relationship path from the node $V_i$ to the node $V_j$ to the node $V_k$. The node relationship set includes relationship paths corresponding to all nodes, and the relationship node set may rapidly determine relationships between the nodes, which is convenient for subsequent information mining based on the relationships between the nodes.

At S102, a spatial distance matrix between the node and corresponding second-order neighbor nodes is acquired.

Normally, a distance between POI nodes may reflect relevance between the POI nodes, and the closer the distance, the stronger the relevance. Therefore, the spatial distances between the POI nodes are analyzed, other than the relationship between the POI nodes.

In an embodiment, the spatial distance between the POI nodes and the corresponding second-order neighbor nodes may be acquired based on coordinates of each node. The spatial distance may be a Euclidean distance, a manhattan distance, or a Chebyshev distance.

In an embodiment, the coordinates of each node may be obtained by the longitude and latitude on the map, or may be obtained by reconstructing a coordinate system.

When the spatial distances between each of the nodes and corresponding all second-order neighbor nodes are acquired, spatial distances corresponding to all nodes are summarized to obtain a spatial distance matrix.

At S103, first POI representation information of the node is determined based on the node relationship set of the node and the spatial distance matrix.

It may be understood that, the node relationship set includes a complex relationship between the nodes, and the spatial distance matrix represents spatial feature information between the nodes, so that the node relationship set and the spatial distance matrix can better reflect feature information corresponding to each node.

In an embodiment, a feature extraction may be performed on the node relationship set and the spatial distance matrix, respectively, and extracted features may be fused to obtain first POI representation information of the node. In embodiments of the disclosure, a POI relationship graph and a node relationship set in the POI relationship graph are obtained, and the node relationship set includes all complex relationships between the nodes; a spatial distance matrix is determined based on spatial positions of the nodes, and the spatial distance matrix reflects spatial feature information between the nodes; the first POI representation information is determined based on the node relationship set and the spatial distance matrix, which overcomes distance information loss in the related art, and can retain long-distance spatial features well and fully mines relationship information and spatial information in a second-order neighborhood of the nodes, and the obtained first POI representation information is more accurate and representative.

Figure 2:
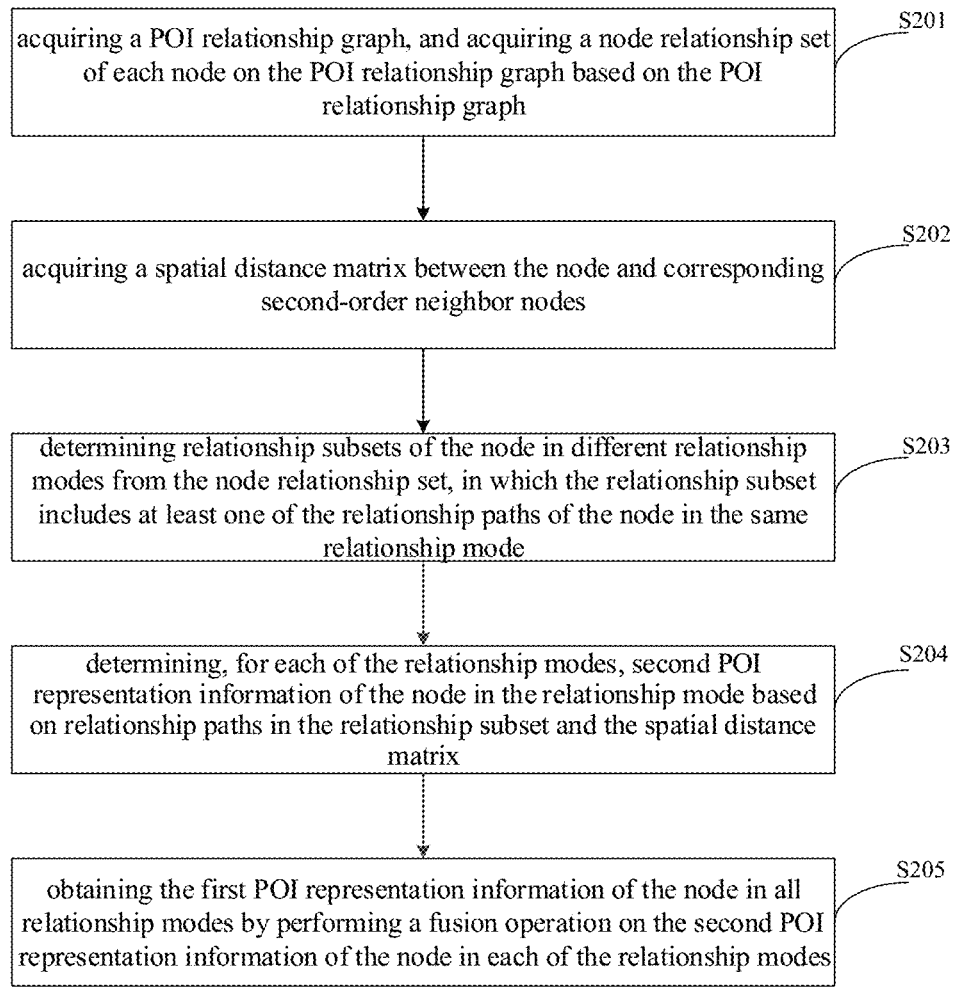
FIG. 2 is a diagram illustrating another method for acquiring point of interest (POI) representation information provided in embodiments of the disclosure.

FIG. 2 is a diagram illustrating a method for acquiring point of interest (POI) representation information provided in embodiments of the present disclosure. As illustrated in FIG. 2, the method includes but not limited to the following steps.

At S201, a POI relationship graph is acquired, and a node relationship set of each node on the POI relationship graph is acquired based on the POI relationship graph.

The POI relationship graph includes edges representing relationships between nodes of POIs, and the node relationship set includes relationship paths where the node reaches all second-order neighbor nodes via any one first-order neighbor node.

In some implementations, the node relationship set of the node may be acquired based on relationships between the node and corresponding all the second-order neighbor nodes.

In another implementations, since a number of second-order neighbor nodes is large but not all second-order neighbor nodes include rich second-order neighborhood information, second-order neighbor nodes of each node may be filtered to improve accuracy of mining second-order neighborhood information.

In an embodiment, for any one candidate second-order neighbor node $V_k$ of the node $V_i$, a path number of relationship paths where the node $V_i$ reaches the node $V_k$ via any one first-order neighbor node $V_j$ is acquired based on the POI relationship graph; one or more candidate second-order neighbor nodes with the path number greater than a set number are determined from all candidate second-order neighbor nodes of the node vi as target second-order neighbor nodes of the nodes for retention; and the node relationship set of the node is acquired by mining relationship paths between the node and the target second-order neighbor nodes.

As an example, for the node $V_i$ and the corresponding any one candidate second-order neighbor node $V_k$, a path number of all relationship paths where the node $V_i$ reaches the candidate second-order neighbor node $V_k$ via any one first-order neighbor node $V_j$ is acquired from the POI relationship graph. All the relationship paths where the node $V_i$ reaches the candidate second-order neighbor node $V_k$ via the any one first-order neighbor node $V_1$ may be represented by: $V_i \overset{R_{i,j}}{\to} V_j \overset{R_{j,k}}{\to} V_k$, $R_{i,j}$ is a relationship between the node $V_i$ and the first-order neighbor node, $R_{j,k}$ is a relationship between the first-order neighbor node $V_j$ and the second-order neighbor node $V_k$. When the path number is greater than a set number, the candidate second-order neighbor node $V_k$ is taken as a target second-order neighbor nodes of the node $V_i$. In this way, a path number of a relationship path between the node $V_i$ and each of the candidate second-order neighbor nodes is determined, and all target second-order neighbor nodes corresponding to the node $V_i$ are determined based on whether the path number is greater than the set number; and a node relationship set is obtained by mining relationship paths between the node $V_i$ and corresponding all target second-order neighbor nodes.

In an embodiment, the second-order neighborhood relationship may be represented by:

$$\aleph^2(V_i, r_1 \to r_2) = \{(V_i, V_k) | V_i \overset{R_{i,j}}{\to} V_j \overset{R_{j,k}}{\to} V_k = r_1 \to r_2\}$$

where, $\aleph^2(V_i, r_1 \to r_2)$ represents a second-order neighborhood relationship of a node $V_i$; $V_j$ represents a first-order neighbor node of a node $V_i$; $V_k$ represents a second-order neighbor node of a node $V_i$; $r_1 \to r_2$ represents a relationship mode, $r_1$ is a relationship between a node $V_i$ and a first-order neighbor node $V_j$, and $r_2$ is a relationship between a first-order neighbor node $V_j$ and a second-order neighbor node $V_k$; $R_{i,j}$ is a relationship between a node $V_i$ and a first-order neighbor node, and same as $r_1$; and $R_{j,k}$ is a relationship between a first-order neighbor node V and a second-order neighbor node $V_k$, and same as $r_2$.

In the embodiments of the present disclosure, an implementation of step S201 may be achieved in any one way of embodiments of the present disclosure, which is not limited nor repeated here.

At S202, a spatial distance matrix between the node and corresponding second-order neighbor nodes is acquired.

In an embodiment, for any one second-order neighbor node of the node, first spatial coordinate information of the node and second spatial coordinate information of the second-order neighbor nodes are acquired; spatial distances between the node and the second-order neighbor nodes are acquired by performing an Euclidean distance operation based on the first spatial coordinate information and the second spatial coordinate information; and the spatial distance matrix is acquired based on the spatial distances between the node and each of the second-order neighbor nodes.

Figure 2A:
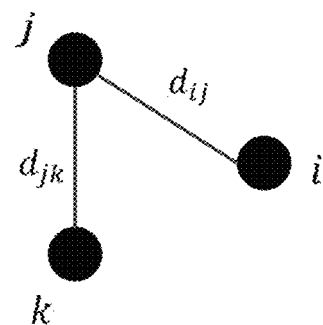
FIG. 2a is a diagram illustrating a spatial distance between nodes provided in embodiments of the present disclosure.

As illustrated in FIG. 2a, it illustrates a schematic diagram of spatial distances between nodes; as an example, a spatial distance between a node and a second-order neighbor node may be:

$$d_{ik}=|L_i-L_k|, k\in(r_1\to r_2)$$

where, $d_{ik}$ represents a spatial distance between a node i and a second-order neighbor node k; $L_i$ represents first spatial coordinate information of a node i; $L_k$ represents second spatial coordinate information of a second-order neighbor node k; $r_1\to r_2$ represents a relationship mode, $r_1$ is a relationship between a node and a first-order neighbor node, and $r_2$ is a relationship between a first-order neighbor node and a second-order neighbor node.

In some implementations, first spatial coordinate information of the node and second spatial coordinate information of the second-order neighbor node may be determined by the longitude and latitude on the map. That is, the first spatial coordinate information is the longitude and latitude of the node, and the second spatial coordinate information is the longitude and latitude of the second-order neighbor node, which better retains spatial features of the node.

In an embodiment, the spatial distance matrix is obtained by arranging spatial distances between the node and each of the second-order neighbor nodes in order. For example, when there are N nodes, and each of the nodes corresponds to M second-order neighbor nodes, spatial distances between each of the nodes and all corresponding second-order neighbor nodes may constitute a submatrix of one row and M columns, and a spatial distance matrix of N rows and M columns is obtained by splicing N submatrices of one row and M columns.

In the embodiments of the present disclosure, an implementation of step S202 may be achieved in any one way of embodiments of the present disclosure, which is not limited nor repeated here.

At S203, relationship subsets of the node in different relationship modes are determined from the node relationship set. The relationship subset includes at least one of the relationship paths of the node in a same relationship mode.

Since there are a plurality of relationship modes in the node relationship set, such as competitive, complementary and dependency. Therefore, the relationship subsets of the node in different relationship modes are determined from the node relationship set. Each relationship subset includes at least one of the relationship paths of the node in the same relationship mode.

Illustratively, for example, relationships that may exist between one node with other nodes include a competitive relationship, a complementary relationship or a dependency relationship, and correspondingly, relationship paths between the node and second-order neighbor nodes may include: "competitive+competitive", "competitive+complementary", "competitive+dependency", "complementary+competitive", "complementary+complementary", "complementary+dependency", "dependency+competitive", "dependency+complementary" and "dependency+dependency". The relationship paths of the node in the same relationship mode are aggregated into a corresponding relationship subset, and for example, all relationship paths of "competitive+competitive" corresponding to the node are aggregated to obtain a corresponding relationship subset.

At S204, for each of the relationship modes, second POI representation information of the node in the relationship mode is determined based on relationship paths in the relationship subset and the spatial distance matrix.

Since the relationship paths of the relationship subset include first-order neighbor nodes and second-order neighbor nodes of the node, when determining the second POI representation information of the node, information represented by the first-order neighbor nodes and the second-order neighbor nodes of the node needs to be considered.

In an embodiment, for each relationship path in the relationship subset corresponding to the same relationship mode, spatial distances between the node and the second-order neighbor nodes in the relationship path are determined based on the spatial distance matrix; third POI representation information of the node in the relationship path is determined based on the spatial distances and the first-order neighbor nodes and the second-order neighbor nodes of the node in the relationship path; and the second POI representation information of the node in the same relationship mode is obtained by performing a fusion operation on all the third POI representation information of the node in the same relationship mode.

That is, for any one relationship path in the relationship subset, spatial distances between the node and the second-order neighbor nodes in the relationship path may be determined based on the spatial distance matrix between the node and all second-order neighbor nodes. The smaller the distance, the stronger the relevance between the node and the second-order neighbor nodes in the relationship path.

In an embodiment, the relationships between the first-order neighbor nodes and the second-order neighbor nodes of the node may be further determined based on the relationship path, and the third POI representation information of the node in the relationship path may be determined based on the spatial distances between the node and the second-order neighbor nodes and the relationships between the first-order neighbor nodes and the second-order neighbor nodes of the node in the relationship path.

In an embodiment, the third POI representation information may be output based on the spatial distances between the node and the second-order neighbor nodes and the relationships between the first-order neighbor nodes and the second-order neighbor nodes of the node in the relationship path.

Further, after the third POI representation information of the node in each relationship path is determined, the second POI representation information of the node in the same relationship mode is obtained by fusing all the third POI representation information of the node in the same relationship mode. Fusing all the third POI representation information may be cumulatively fusing all the third POI representation information, or calculating and fusing average information of all the third POI representation information. The second POI representation information of the node in the same relationship mode is determined by fusing all the third POI representation information, so that features included in the second POI representation information are more comprehensive and accurate.

At S205, the first POI representation information of the node in all relationship modes is obtained by performing a fusion operation on the second POI representation information of the node in each of the relationship modes.

In an embodiment, when the second POI representation information of the node in each of the relationship modes is determined, the first POI representation information of the node in all the relationship modes may be obtained by performing a fusion operation on the second POI representation information of the node in each of the relationship modes.

In an embodiment, the fusion operation may be accumulating second POI representation information of the node in each of the relationship modes, or may be calculating average information of the second POI representation information of the node in all the relationship modes, and finally confirming the first POI representation information of the node in all the relationship modes, to ensure that the first POI representation information is more accurate.

For example, the method for acquiring the first POI representation information may be:

$$h_{i,intra} = \sum_{(r_1,r_2) \in R*R} \frac{1}{|R*R|} * h_{i,r_1 \to r_2}$$

where, $h_{i,intra}$ represents first POI feature information; $h_{i,r_1 \to r_2}$ represents second POI feature information; $|R*R|$ represents a number of all relationship modes; $r_1 \to r_2$ represents a relationship mode, $r_1$ are relationships between the node and the first-order neighbor nodes, and $r_2$ are relationships between the first-order neighbor nodes and the second-order neighbor nodes.

That is, the first POI representation information of the node in all relationship modes is obtained by averaging the second POI feature information of the node in all the relationship modes.

In an embodiment, when the first POI representation information of the node in all relationship modes is determined, a processing result of a downstream task may be obtained by performing a downstream task processing on the node based on the first POI feature information of the node.

It may be understood that, the downstream task is a task that really needs to be solved, and the processing result of the downstream task of the node may be considered as whether the node may solve the downstream task. For example, in the embodiment, it needs to make a recommendation for a travel of the user; after determining the first POI feature information of each node, a value to recommend of the node may be acquired based on the first POI feature information of the node, whether the node needs to be recommended or not may be determined based on the value to recommend of the node, that is, whether the node may be taken as a final result of the downstream task is determined, to ensure accuracy of the downstream task.

In the embodiments of the disclosure, relationship subsets of the node in different relationship modes are determined from the node relationship set, and a relationship subset in the same relationship mode is analyzed, to ensure the accuracy and reliability of the analysis; for each relationship mode, spatial distances between the node and the second-order neighbor nodes in each of the relationship paths in the relationship subset are obtained, third POI representation information is determined based on the spatial distances and the relationship between the first-order neighbor nodes and the second-order neighbor nodes in the relationship path, and the third POI representation information for each relationship path is fused to obtain second POI representation information, to ensure that information included in the second POI representation information is more comprehensive, and further all the second POI representation information is fused to obtain first POI representation information of the node, which retains complex relationships and spatial distances better, and improves accuracy of the first POI representation information; a downstream task processing is performed based on more accurate first POI representation information, so that the obtained processing result of the downstream task is more accurate.

Figure 3:
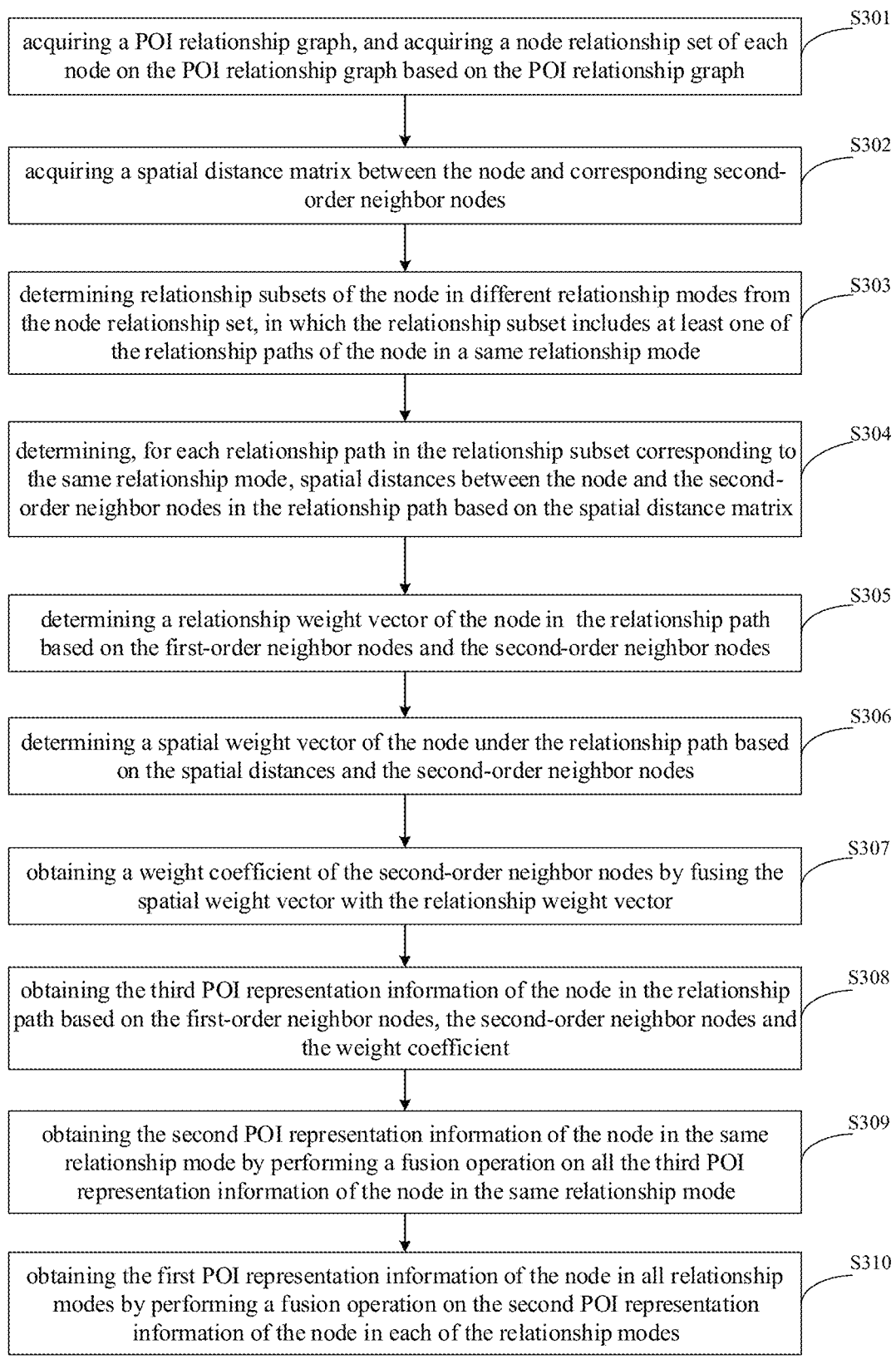
FIG. 3 is a diagram illustrating another method for acquiring point of interest (POI) representation information provided in embodiments of the disclosure.

FIG. 3 is a diagram illustrating a method for acquiring point of interest (POI) representation information provided in embodiments of the present disclosure. As illustrated in FIG. 3, the method includes but not limited to the following steps.

At S301, a POI relationship graph is acquired, and a node relationship set of each node on the POI relationship graph is acquired based on the POI relationship graph.

The POI relationship graph includes edges representing relationships between nodes of POIs, and the node relationship set includes relationship paths where the node reaches all second-order neighbor nodes via any one first-order neighbor node.

In the embodiments of the present disclosure, an implementation of step S301 may be achieved in any one way of embodiments of the present disclosure, which is not limited here nor repeated here.

At S302, a spatial distance matrix between the node and corresponding second-order neighbor nodes is acquired.

In the embodiments of the present disclosure, an implementation of step S302 may be achieved in any one way of embodiments of the present disclosure, which is not limited here nor repeated here.

At S303, relationship subsets of the node in different relationship modes are determined from the node relationship set. The relationship subset includes at least one of the relationship paths of the node in a same relationship mode.

In the embodiments of the present disclosure, an implementation of step S303 may be achieved in any one way of embodiments of the present disclosure, which is not limited here nor repeated here.

At S304, for each relationship path in the relationship subset corresponding to the same relationship mode, spatial distances between the node and the second-order neighbor nodes in the relationship path are determined based on the spatial distance matrix.

In the embodiments of the present disclosure, an implementation of step S304 may be achieved in any one way of embodiments of the present disclosure, which is not limited here nor repeated here.

At S305, a relationship weight vector of the node in the relationship path is determined based on the first-order neighbor nodes and the second-order neighbor nodes.

In an embodiment, first feature vectors of the first-order neighbor nodes and second feature vectors of the second-order neighbor nodes of the node in the relationship path are determined; and the relationship weight vector corresponding to the node is determined by performing a linear transformation on the first feature vectors and the second feature vectors.

In an embodiment, the first feature vectors of the first-order neighbor nodes and the second feature vectors of the second-order neighbor nodes of the node may be feature vectors extracted based on information such as POI types of the neighbor nodes, and configured to represent features of the first-order neighbor nodes and the second-order neighbor nodes. In an embodiment, dimensions of the first feature vectors and the second feature vectors are same or different.

In an embodiment, the linear transformation may be splicing, projection, expansion or rotation, etc.

At S306, a spatial weight vector of the node in the relationship path is determined based on the spatial distances and the second-order neighbor nodes.

In an embodiment, representation vectors of the spatial distances and second feature vectors of the second-order neighbor nodes are determined; and the spatial weight vector corresponding to the node is determined by performing a linear transformation on the representation vectors of the spatial distances and the second feature vectors.

In an embodiment, the representation vectors of the spatial distances are configured to reflect features of the spatial distances. The representation vectors of the spatial distances may be kept same as dimensions of the first feature vectors and the second feature vectors.

In an embodiment, the linear transformations may be splicing, projection, expansion or rotation, etc. For example, the representation vectors of the spatial distances and the second feature vectors of the second-order neighbor nodes are spliced, and the spliced vector is determined as the spatial weight vector corresponding to the node.

At S307, a weight coefficient of the second-order neighbor nodes is obtained by fusing the spatial weight vector with the relationship weight vector.

In an embodiment, the spatial weight vector may be fused with the relationship weight vector in a weighted mean method or a principal component analysis method. The fused weight coefficient includes spatial information between nodes and relationship information between nodes. The third POI representation information of the node is acquired by using the fused weight coefficient, and the third POI representation information is more representative.

At S308, the third POI representation information of the node in the relationship path is obtained based on the first-order neighbor nodes, the second-order neighbor nodes and the weight coefficient.

In an embodiment, the third POI representation information of the node in the relationship path may be obtained based on the first feature vectors of the first-order neighbor nodes, the second feature vectors of the second-order neighbor nodes and the weight coefficient.

Since the weight coefficient includes spatial distance information and relationship information between the node and the second-order neighbor nodes, the weight coefficient may be taken as a weight of the second feature vector of the second-order neighbor node, and the second feature vector may be performed with a weight operation by using the weight coefficient, and then fused with the first feature vector to obtain the third POI representation information of the node in the relationship path.

In an embodiment, the third POI representation information may be obtained by adding the first feature vectors to the vectors obtained by performing the weight operation on the second feature vectors by using the weight coefficient.

At S309, the second POI representation information of the node in the same relationship mode is obtained by performing a fusion operation on all the third POI representation information of the node in the same relationship mode.

In the embodiments of the present disclosure, an implementation of step S309 may be achieved in any one way of embodiments of the present disclosure, which is not limited here nor repeated here.

At S310, the first POI representation information of the node in all relationship modes is obtained by performing a fusion operation on the second POI representation information of the node in each of the relationship modes.

In the embodiments of the present disclosure, an implementation of step S310 may be achieved in any one way of embodiments of the present disclosure, which is not limited here nor repeated here.

In embodiments of the disclosure, first feature vectors of the first-order neighbor nodes and second feature vectors of the second-order neighbor nodes of the node are determined, to respectively represent features corresponding to the first-order neighbor nodes and the second-order neighbor nodes; a relationship weight vector is determined by performing a linear transformation on the first feature vectors and the second feature vectors; representation vectors of features representing the spatial distances are determined, and a spatial weight vector is determined by using the representation vectors and the second feature vectors, and a weight coefficient is obtained by fusing the relationship weight vector and the spatial weight vector, and the weight coefficient includes the relationship information and the spatial relationship information between the nodes, and the second feature vectors are weighted by using the weight coefficient and combined with the first feature vectors to obtain third POI feature information. Influence of the second-order neighbor nodes is measured based on information in both aspects, the third POI feature information is more accurate, and the first POI feature information obtained by using the third POI feature information is more convincing and more accurate.

Figure 4:
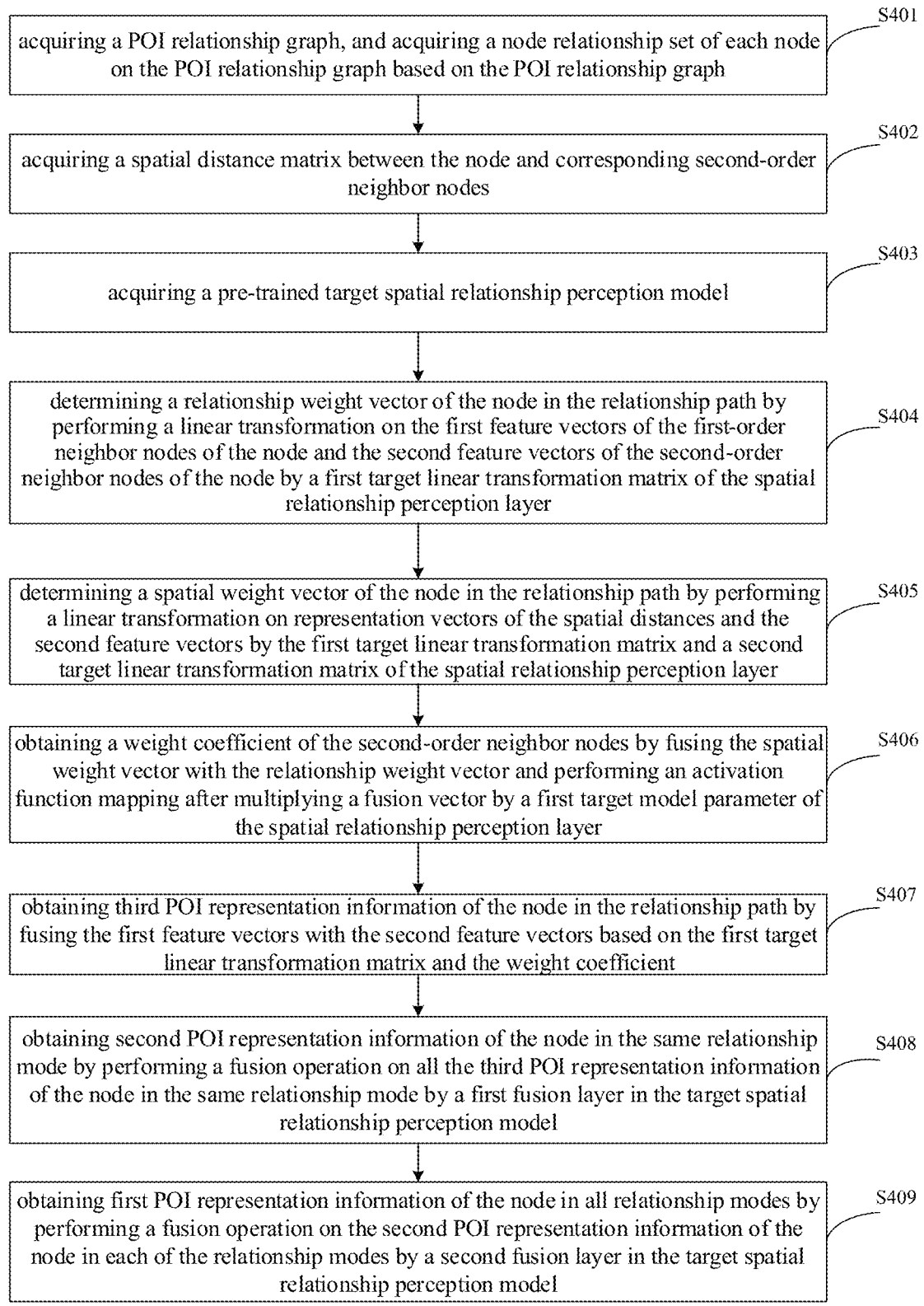
FIG. 4 is a diagram illustrating another method for acquiring point of interest (POI) representation information provided in embodiments of the disclosure.

FIG. 4 is a diagram illustrating a method for acquiring point of interest (POI) representation information provided in embodiments of the present disclosure. As illustrated in FIG. 4, the method includes but not limited to the following steps.

At S401, a POI relationship graph is acquired, and a node relationship set of each node on the POI relationship graph is acquired based on the POI relationship graph.

The POI relationship graph includes edges representing relationships between nodes of POIs, and the node relationship set includes relationship paths where the node reaches all second-order neighbor nodes via any one first-order neighbor node.

In the embodiments of the present disclosure, an implementation of step S401 may be achieved in any one way of embodiments of the present disclosure, which is not limited here nor repeated here.

At S402, a spatial distance matrix between the node and corresponding second-order neighbor nodes is acquired.

In the embodiments of the present disclosure, an implementation of step S402 may be achieved in any one way of embodiments of the present disclosure, which is not limited here nor repeated here.

At S403, a pre-trained target spatial relationship perception model is acquired.

In an embodiment, first POI representation information may be acquired based on the target spatial relationship perception model. The target spatial relationship perception model may be a graph neural network, to facilitate to extract and discover features and modes in graph structure data, which improves efficiency and accuracy of acquiring the first POI representation information.

At S404, a relationship weight vector of the node in the relationship path is determined by performing a linear transformation on first feature vectors of the first-order neighbor nodes of the node and second feature vectors of the second-order neighbor nodes of the node by a first target linear transformation matrix of the spatial relationship perception layer.

In some implementations, the spatial relationship perception layer is a processing layer of the target spatial perception model, and the spatial relationship perception layer corresponds to a first target linear transformation matrix that may be obtained from a training process of the target spatial perception model.

Further, a relationship weight vector of the node in the relationship path is determined by performing a linear transformation on the first feature vectors of first-order neighbor nodes of the node and the second feature vectors of the second-order neighbor nodes based on a first target linear transformation matrix. That is, the relationship weight vector is obtained based on the first target linear transformation matrix, the first feature vectors and the second feature vectors.

In an embodiment, the method for acquiring the relationship weight vector may be:

$$S_{r_1,r_2}^{rel} = W_{r_1,r_2}^{rel}[W_{r_1 \to r_2} h_j \oplus W_{r_1 \to r_2} h_k]$$

where, $S_{r_1,r_2}^{rel}$ represents a relationship weight vector, $r_1$ and $r_2$ respectively represent relationships in a relationship path, that is, a relationship between a node and a first-order neighbor node, and a relationship between a first-order neighbor node and a second-order neighbor node; $W_{r_1,r_2}^{rel}$ represents a target relationship linear transformation matrix configured to perform a fusion transformation on $[W_{r_1 \to r_{2l}\,j} \oplus W_{r_1 \to r_2} h_k]$ again, and may be obtained in a training process of a target spatial perception model; $W_{r_1 \to r_2}$ represents a first target linear transformation matrix, $h_j$ represents a first feature vector of a first-order neighbor node; $h_k$ represents a second feature vector of a second-order neighbor node; and $\oplus$ represents a splicing symbol for a splicing operation on vectors.

That is, the first target linear transformation matrix is respectively multiplied by the first feature vector and the second feature vector, and the multiplied vector results are spliced, to determine the relationship weight vector. The relationship weight vector fuses features and relationship features of the first-order neighbor node and the second-order neighbor node, to ensure accuracy of acquiring subsequent representation information.

At S405, a spatial weight vector of the node in the relationship path is determined by performing a linear transformation on representation vectors of the spatial distances and the second feature vectors by the first target linear transformation matrix and a second target linear transformation matrix of the spatial relationship perception layer.

It may be understood that, sample representation vectors of the sample spatial distances are vectors representing sample spatial features. In some implementations, the second target linear transformation matrix of the spatial relationship perception layer is obtained in a training process of the target spatial perception model.

In an embodiment, the method for acquiring the spatial weight vector may be:

$$S_{r_1,r_2}^{spa} = W_{r_1,r_2}^{spa}[G_{r_1,r_2} d_{i,j} \oplus W_{r_1 \to r_2} h_k]$$

where, $S_{r_1,r_2}^{spa}$ represents a spatial weight vector, $r_1$ and $r_2$ respectively represent relationships in a relationship path, that is, a relationship between a node and a first-order neighbor node, and a relationship between a first-order neighbor node and a second-order neighbor node; $W_{r_1,r_2}^{spa}$ represents a target spatial linear transformation matrix configured to perform a fusion transformation on $[G_{r_1,r_2} d_{i,j} \oplus W_{r_1 \to r_2} h_k]$ again, and may be obtained in a training process of a target spatial perception model; $G_{r_1,r_2}$ represents a second target linear transformation matrix; $d_{i,j}$ represents a representation vector of a spatial distance; $W_{r_1 \to r_2}$ is a first target linear transformation matrix; $h_k$ represents a second feature vector of a second-order neighbor node; and $\oplus$ represents a splicing symbol for a splicing operation on vectors.

That is, the first target linear transformation matrix is multiplied by the second feature vector, and the second target linear transformation matrix is multiplied by the representation vector, and the multiplied vectors are spliced to obtain the spatial weight vector, which fully reflects spatial features of the node in the relationship path and more accurately acquires the representation information based on the spatial weight vector.

At S406, a weight coefficient of the second-order neighbor nodes is obtained by fusing the spatial weight vector with the relationship weight vector and performing an activation function mapping after multiplying the fused vector by a first target model parameter of the spatial relationship perception layer.

In an embodiment, the method for acquiring the weight coefficient may be:

$$\phi(i,j,k) = \text{sigmoid}(a_{r_1,r_2} * (S_{r_1,r_2}^{rel} + S_{r_1,r_2}^{spa}))$$

where, $\phi(i,j,k)$ represents a weight coefficient, and i,j, k are respectively a node, a first-order neighbor node of the node and a second-order neighbor node of the node; $a_{r_1,r_2}$ represents a first target model parameter that may be obtained by training a target spatial relationship perception model; $S_{r_1,r_2}^{rel}$ represents a relationship weight vector; $S_{r_1,r_2}^{spa}$ represents a spatial weight vector; and sigmoid represents an activation function.

In an embodiment, the activation function may be further a tanh function or a ReLU function, which is not limited here.

The weight coefficient fuses information of a spatial perspective and information of a relationship perspective in a second-order neighborhood, which measures importance and influence of the second-order neighbor node more accurately.

At S407, third POI representation information of the node in the relationship path is obtained by fusing the first feature vectors with the second feature vectors based on the first target linear transformation matrix and the weight coefficient.

In an embodiment, a first transformation result may be obtained by performing a linear transformation on the first feature vectors based on the first linear transformation matrix; weighted second feature vectors may be obtained by weighting the second feature vectors and the weight coefficient; a second transformation result may be obtained by performing a linear transformation on the weighted second feature vectors based on the first target linear transformation matrix; and the third POI representation information of the node in the relationship path may be obtained by adding the first transformation result and the second transformation result together.

For example, acquiring the third POI representation information may be:

$$h_{i,r_1 \to r_2} = \Sigma_{(r_j,r_k) \in (r_1 \to r_2)}(W_{r_1 \to r_2} h_j + \phi(i,j,k) * W_{r_1 \to r_2} h_k)$$

where, $h_{i,r_1 \to r_2}$ represents third POI representation information; $h_j$ represents a first feature vector; $W_{r_1 \to r_2}$ represents a first target linear transformation matrix; $W_{r_1 \to r_2} h_j$ represents a first transformation result; $\phi(i,j,k)$ represents a weight coefficient; $h_k$ represents a second feature vector; and $\phi(i,j,k)*W_{r_1 \to r_2}h_k$ represents a second transformation result.

Since the weight coefficient includes spatial information and relationship information, through fusing the first feature vector and the second feature vector by using the weight coefficient and the first target linear transformation matrix, the spatial information and the relationship information are well retained, the obtained third POI representation information is more rich and comprehensive, and the representation information of the node in the relationship path is mined more fully.

At S408, second POI representation information of the node in the same relationship mode is obtained by performing a fusion operation on all the third POI representation information of the node in the same relationship mode by a first fusion layer in the target spatial relationship perception model.

In an embodiment, since the third POI representation information of the node in each relationship path is actually in a vector form, the first fusion layer in the target spatial relationship perception model performs a fusion operation on all the third POI representation information of the node in the same relationship mode, which may be a weighted sum operation for all the third POI representation information, or may be an average operation for all the third POI representation information. That is, the third POI representation information of the node in all relationship paths in the same relationship mode is aggregated to obtain the second POI representation information of the node in the same relationship mode; the second POI representation information includes relationship information and spatial information, thus the representation information of the node in the relationship mode is fully mined.

At S409, first POI representation information of the node in all relationship modes is obtained by performing a fusion operation on the second POI representation information of the node in each of the relationship modes by a second fusion layer in the target spatial relationship perception model.

Further, when the second POI representation information of the node in the same relationship mode is determined based on the first fusion layer in the target spatial relationship perception model, the first POI representation information of the node in all the relationship modes is obtained by performing a fusion operation on the second POI representation information of the node in each of the relationship modes. That is, the first POI representation information of the node in all the relationship modes is obtained by performing a weighted sum operation on all the second POI feature information or averaging all the second POI feature information.

Figure 4A:
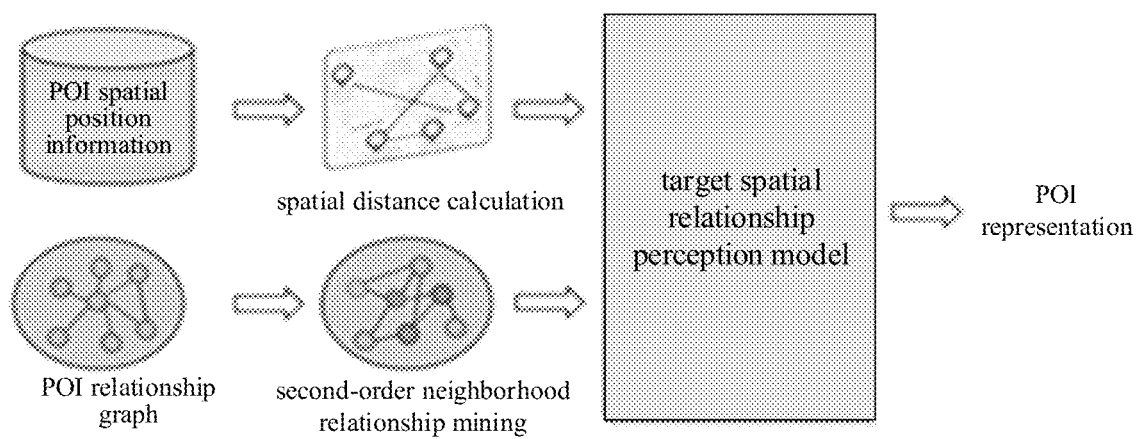
FIG. 4a is logic diagram illustrating another method for acquiring point of interest (POI) representation information provided in embodiments of the disclosure.

As illustrated in FIG. 4a, in embodiments of the disclosure, a spatial distance is calculated based on POI spatial position information, a second-order neighborhood relationship of the node is mined based on the POI relationship graph, and the mined second-order neighborhood relationship and the spatial distance are input into a target spatial relationship perception model to obtain a POI representation, that is, first POI representation information. The first POI representation information not only retains a complex relationship between the nodes in the first POI representation information, but also retains spatial feature information between the nodes, so that information of the POI nodes is mined more fully, and the first POI representation information is more accurate.

In the embodiments of the disclosure, the pre-trained target spatial relationship perception model is acquired, and the first POI representation information is acquired by using the target spatial relationship perception model, so that a processing speed is higher, and a result is more stable and accurate; the first feature vectors and the second feature vectors are processed by using the first target linear transformation matrix in the target spatial relationship perception model to obtain a relationship weight vector in the relationship path, retaining the relationship information between the nodes; and the representation vectors and the second feature vectors are processed by using the second target linear transformation matrix and the first target linear transformation matrix in the target spatial relationship perception model to determine the spatial weight vector, so that the spatial feature information between the nodes is retained more completely. The weight coefficient is determined based on the first target model parameter, the relationship weight vector and the spatial weight vector, the relationship information and the spatial information are reasonably fused to obtain the third POI representation information by using the weight coefficient, and the third POI representation information is fused to obtain the final first POI representation information. When mining the first POI representation information, the complex relationship between the nodes and the spatial feature relationship between the nodes are retained, and thus the obtained first POI representation information is more comprehensive and accurate.

Figure 5:
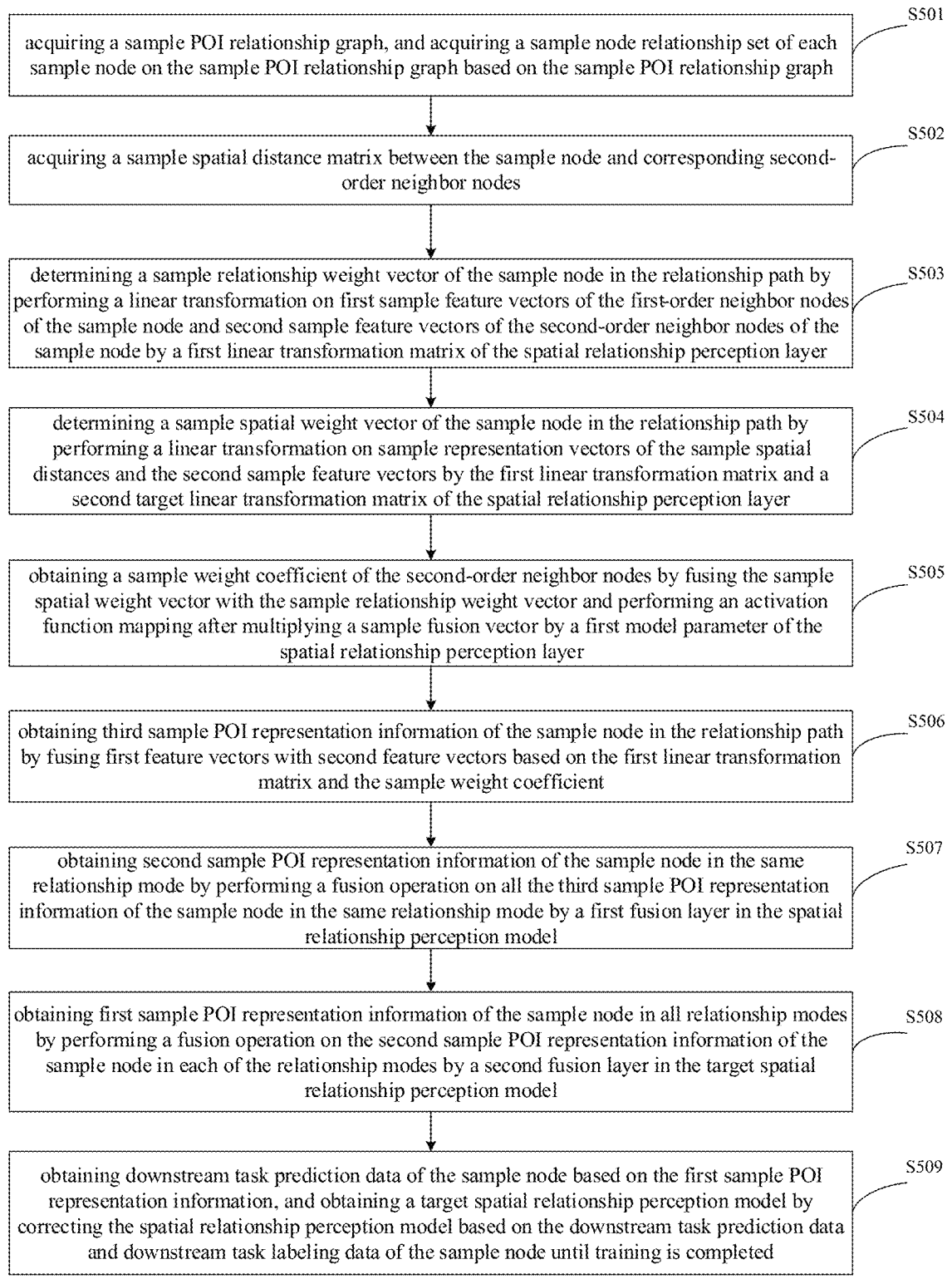
FIG. 5 is a diagram illustrating a method for training a spatial relationship perception model for points of interest (POIs) provided in embodiments of the present disclosure.

A training process of a spatial relationship perception model of POIs is illustrated in the method for acquiring POI representation information on the basis of the above embodiments. FIG. 5 is a diagram illustrating a method for training a spatial relationship perception model for points of interest (POIs) provided in embodiments of the present disclosure. As illustrated in FIG. 5, the method includes but not limited to the following steps.

At S501, a sample POI relationship graph is acquired, and a sample node relationship set of each sample node on the sample POI relationship graph is acquired based on the sample POI relationship graph.

The sample POI relationship graph includes edges representing relationships between sample nodes of the POIs, and the sample node relationship set includes relationship paths where the sample nodes reach all second-order neighbor nodes via any one first-order neighbor node.

In an embodiment, a sample POI relationship graph may be determined based on an existing map, and the sample POI relationship graph includes relationships between different sample nodes.

Each sample node in the sample POI relationship graph represents different sample POIs, and there is a certain relationship between connected sample nodes. A sample node relationship set corresponding to each sample node is determined based on a connection situation between each sample node and other sample nodes.

In an embodiment, the sample relationship set includes relationship paths where the node reaches all second-order neighbor nodes via any one first-order neighbor node.

At S502, a sample spatial distance matrix between the sample node and corresponding second-order neighbor nodes is acquired.

In an embodiment, sample spatial distances between the sample node and the second-order neighbor nodes may be acquired based on coordinate information of the sample node and coordinate information of the second-order neighbor nodes. The sample spatial distance may be a Euclidean distance, a manhattan distance, or a Chebyshev distance.

In the embodiments of the disclosure, taking the Euclidean distance as a sample spatial distance, corresponding sample spatial distances are acquired based on coordinate information of the sample node and the corresponding second-order neighbor node, and a corresponding sample spatial distance matrix is acquired based on all the sample spatial distances corresponding to the sample node.

At S503, a sample relationship weight vector of the sample node in the relationship path is determined by performing a linear transformation on first sample feature vectors of the first-order neighbor nodes of the sample node and second sample feature vectors of the second-order neighbor nodes of the sample node by a first linear transformation matrix of the spatial relationship perception layer.

It may be understood that, the first sample feature vectors of the first-order neighbor nodes are vectors representing features of the first-order neighbor nodes, and the second sample feature vectors of the second-order neighbor nodes are vectors representing features of the second-order neighbor nodes. The first sample feature vectors and the second sample feature vectors may be determined respectively based on a type of the sample node.

In some implementations, the first linear transformation matrix may be a randomly generated initialization matrix, and the first linear transformation matrix is optimized and adjusted in continuous training of the spatial relationship perception model.

In an embodiment, the method for acquiring the sample relationship weight vector may be:

$$S_{r_1,r_2}^{rel\prime} = W_{r_1,r_2}^{rel\prime}[W_{r_1\to r_2}\prime h_j\prime \oplus W_{r_1\to r_2}\prime h_k\prime]$$

where, $S_{r_1,r_2}^{rel\prime}$ represents a sample relationship weight vector, $r_1$ and $r_2$ respectively represent relationships in the relationship paths, that is, a relationship between the node and the first-order neighbor node, and a relationship between the first-order neighbor node and the second-order neighbor node; $W_{r_1,r_2}^{rel\prime}$ represents a relationship linear transformation matrix configured to perform a fusion transformation on $[W_{r_1\to r_2}\prime h_j\prime \oplus W_{r_1\to r_2}\prime h_k\prime]$, and may be a randomly generated initialization matrix, and optimized and adjusted in continuous training of the spatial relationship perception model; $W_{r_1\to r_2}\prime$ represents a first linear transformation matrix; $h_j\prime$ represents a first sample feature vector of the first-order neighbor node; $h_k\prime$ represents a second sample feature vector of the second-order neighbor node; and $\oplus$ represents a splicing symbol for a splicing operation on the vectors.

At S504, a sample spatial weight vector of the sample node in the relationship path is determined by performing a linear transformation on sample representation vectors of the sample spatial distances and the second sample feature vectors by the first linear transformation matrix and a second target linear transformation matrix of the spatial relationship perception layer.

It may be understood that, the sample representation vectors of the sample spatial distances are vectors representing sample spatial features. In some implementations, the second linear transformation matrix may be a randomly generated initialization matrix, and the second linear transformation matrix is optimized and adjusted in continuous training of the spatial relationship perception model.

In an embodiment, the method for acquiring the sample spatial weight vector may be:

$$S_{r_1,r_2}^{spa\prime} = S_{r_1,r_2}^{spa\prime}[G_{r_1,r_2}\prime d_{i,j}\prime \oplus W_{r_1\to r_2}\prime h_k\prime]$$

where, $S_{r_1,r_2}^{spa\prime}$ represents a sample spatial weight vector, $r_1$ and $r_2$ respectively represent relationships in the relationship path, that is, a relationship between the node and the first-order neighbor node, and a relationship between the first-order neighbor node and the second-order neighbor node; $W_{r_1,r_2}^{spa\prime}$ represents a spatial linear transformation matrix configured to perform a fusion transformation on $[G_{r_1,r_2}\prime d_{i,j}\prime \oplus W_{r_1\to r_2}\prime h_k\prime]$, and may be a randomly generated initialization matrix, and optimized and adjusted in continuous training of the spatial relationship perception model; $G_{r_1,r_2}\prime$ represents a second linear transformation matrix; $d_{i,j}\prime$ represents a sample representation vector of the sample spatial distances; $W_{r_1\to r_2}\prime$ represents a first linear transformation matrix; $h_k\prime$ represents a second feature vector of the second-order neighbor node; and $\oplus$ represents a splicing symbol for a splicing operation on the vectors.

At S505, a sample weight coefficient of the second-order neighbor nodes is obtained by fusing the sample spatial weight vector with the sample relationship weight vector and performing an activation function mapping after multiplying a sample fusion vector by a first model parameter of the spatial relationship perception layer.

In some implementations, fusing the sample spatial weight vector with the sample relationship weight vector may be adding the sample spatial weight vector and the sample relationship weight vector together, to obtain a sample weight coefficient including spatial information and relationship information.

In an embodiment, the activation function may be a sigmoid function, a tanh function or a ReLU function.

In an embodiment, the method for acquiring the sample weight coefficient may be:

$$\phi(i,j,k)\prime = \mathrm{sigmoid}(a_{r_1,r_2}\prime * (S_{r_1,r_2}^{rel\prime} + S_{r_1,r_2}^{spa\prime}))$$

where, $\phi(i,j,k)\prime$ represents a sample weight coefficient, and i,j, k are respectively a node, a first-order neighbor node of the node and a second-order neighbor node of the node; $a_{r_1,r_2}\prime$ represents a first model parameter that may be obtained in the process of training a spatial relationship perception model; $S_{r_1,r_2}^{rel\prime}$ represents a sample relationship weight vector; $S_{r_1,r_2}^{spa\prime}$ represents a sample spatial weight vector; and sigmoid represents an activation function.

At S506, third sample POI representation information of the sample node in the relationship path is obtained by fusing first feature vectors with second feature vectors based on the first linear transformation matrix and the sample weight coefficient.

In an embodiment, a first transformation result may be obtained by performing a linear transformation on the first sample feature vectors based on the first linear transformation matrix; weighted second sample feature vectors may be obtained by weighting the second sample feature vectors and the sample weight coefficient, and a second transformation result may be obtained by performing a linear transformation on the weighted second sample feature vectors based on the first linear transformation matrix; and the third sample POI representation information of the sample node in the relationship path may be obtained by adding the first transformation result and the second transformation result together.

For example, acquiring the third POI representation information may be:

$$h_{i,r_1\to r_2}\prime = \Sigma_{(V_j,V_k)\in(r_1\to r_2)}(W_{r_1\to r_2}\prime h_j\prime + \phi(i,j,k)\prime * W_{r_1\to r_2}\prime h_k\prime)$$

where, $h_{i,r_1\to r_2}\prime$ represents third sample POI representation information; $h_j\prime$ represents a first feature vector; $W_{r_1\to r_2}\prime$ represents a first linear transformation matrix; $W_{r_1\to r_2}\prime h_j\prime$ represents a first transformation result; φ(i,j, k)' represents a sample weight coefficient; $h_k'$ represents a second feature vector; and (φ(i,j,k)'*$W_{r_1,r_2}$'$h_k$' represents a second transformation result.

At S507, second sample POI representation information of the sample node in the same relationship mode is obtained by performing a fusion operation on all the third sample POI representation information of the sample node in the same relationship mode by a first fusion layer in the spatial relationship perception model.

It may be understood that, the third sample POI representation information of the sample node in each relationship path is actually a vector. Therefore, a fusion operation is performed on all the third sample POI representation information of the sample node in the same relationship mode by using the first fusion layer of the spatial relationship perception model.

In an embodiment, performing the fusion operation on all the third sample POI representation information of the sample node in the same relationship mode may be performing a weighted sum operation on all the third sample POI representation information, or may be averaging all the third sample POI representation information.

The second sample POI representation information of the sample node in the same relationship mode is obtained by performing a fusion operation on all the third sample POI representation information of the sample node in the same relationship mode.

At S508, first sample POI representation information of the sample node in all relationship modes is obtained by performing a fusion operation on the second sample POI representation information of the sample node in each of the relationship modes by a second fusion layer in the target spatial relationship perception model.

It may be understood that, the second sample POI representation information of the sample node in each relationship mode is actually also a vector. Therefore, when determining the first sample POI representation information of the sample node, a fusion operation may be performed on the second sample POI representation information of the sample node in all the relationship modes by using the second fusion layer of the spatial relationship perception model.

In an embodiment, performing the fusion operation on the second sample POI representation information of the sample node in all the relationship modes may be performing a weighted sum operation on all the second sample POI representation information, or may be averaging all the second sample POI representation information.

The first sample POI representation information of the sample node in all the relationship modes is obtained by performing a fusion operation on the second sample POI representation information of the sample node in all the relationship modes.

At S509, downstream task prediction data of the sample node is obtained based on the first sample POI representation information, and a target spatial relationship perception model is obtained by correcting the spatial relationship perception model based on the downstream task prediction data and downstream task labeling data of the sample node until training is completed.

In an embodiment, the downstream task is a task that really needs to be solved. For example, in a location recommendation scenario, the downstream task is to obtain a final recommendation location.

In some implementations, when determining the first sample POI representation information of the sample node, the downstream task prediction data of the sample node may be determined. For example, assuming that in the location recommendation scenario, a predicted value to be recommended, i.e., downstream task prediction data, of a certain sample node may be determined based on the first sample POI representation information of the sample node.

In an embodiment, a loss function of the spatial relationship perception model is determined based on the downstream task prediction data and the downstream task labeling data of the sample node; the target spatial relationship perception model is obtained by correcting the first linear transformation matrix, the second linear transformation matrix and the first model parameter in the spatial relationship perception model based on the loss function, and returning to a next sample to continue training the corrected spatial relationship perception model until training is completed. The target spatial relationship perception model includes a first target linear transformation matrix, a second target linear transformation matrix and a first target model parameter.

In an embodiment, the loss function of the spatial relationship perception model may be an absolute difference value between the downstream task prediction data and the downstream task labeling data of the sample node. It may be understood that the smaller the loss function value, the more likely the spatial relationship perception model converges. That is, the absolute difference value is configured to reflect a difference between the downstream task prediction data and the actual downstream task labeling data of the sample node, the greater the absolute difference value, the larger the difference between the downstream task prediction data and the actual downstream task labeling data of the sample node, the worse the effect of the spatial relationship perception model in acquiring the first sample POI representation information.

For example, assuming that the downstream task is to make a location recommendation, the downstream task prediction data is a score of the sample POI node. A score of the sample POI node may be obtained by matching similarity between the first sample POI representation information and the task representation information output by the spatial relationship perception model. A loss function between the score of the sample POI node and a label value of the sample POI node is calculated. The label value is the downstream task labeling data, and when the loss function converges, training of the spatial perception model is completed.

Illustratively, assuming that the downstream task is to perform a competition analysis on the sample POI nodes, the downstream task prediction data are the first sample representation information of the sample POI nodes, the downstream task labeling data may be label values of whether a competitive relationship exists between the sample POI nodes. The label values may be 0 and 1, where 0 represents that the competitive relationship does not exist, and 1 represents that the competitive relationship exists. A loss function is calculated based on the first sample POI representation information of the sample POI node and the label value of the sample POI node, and training of the spatial perception model is completed when the loss function converges.

It may be understood that, the first linear transformation matrix, the second linear transformation matrix and the first model parameter in the spatial relationship perception model are corrected, and new first sample POI representation information of the sample node may be determined based on a corrected first linear transformation matrix, a corrected second linear transformation matrix and a corrected first model parameter; and new downstream task prediction data are acquired based on the new first sample POI representation information, and a new loss function is acquired based on the new downstream task prediction data.

It needs to be noted that, if an acquisition process of the sample relationship weight vector and the sample spatial weight vector includes a relationship linear transformation matrix and a spatial linear transformation matrix, the relationship linear transformation matrix and the spatial linear transformation matrix need to be corrected, and the sample relationship weight vector and the sample spatial weight vector are acquired based on the corrected relationship linear transformation matrix and the corrected spatial linear transformation matrix for subsequent calculation.

The first linear transformation matrix, the second linear transformation matrix and the first model parameter in the spatial relationship perception model are continuously corrected, so that the result of the loss function is continuously changed until the loss function converges, the correction of the spatial relationship perception model is completed, namely the training of the spatial relationship perception model is completed, and the target spatial relationship perception model is obtained. In this case, the target spatial perception model includes the first target linear transformation matrix, the second target linear transformation matrix and the first target model parameter.

It should be noted that, when the acquisition process of the sample relationship weight vector and the sample spatial weight vector includes a relationship linear transformation matrix and a spatial linear transformation matrix, the target spatial perception model further includes a target relationship linear transformation matrix and a target spatial linear transformation matrix.

In the embodiments of the disclosure, a sample node relationship set is acquired by acquiring the sample POI relationship graph; first sample POI representation information is acquired based on relationship paths in the sample node relationship set and spatial distances between the sample nodes, downstream task prediction data are acquired based on the first sample POI representation information, a loss function is acquired based on the downstream task prediction data and actual downstream task labeling data, and a first linear transformation matrix, a second linear transformation matrix and a first model parameter in the spatial relationship perception model are continuously corrected based on the loss function, so that the loss function of the spatial relationship perception model converges; the spatial relationship perception model is trained based on relationship information and spatial information in the actual sample POI relationship graph, so that the spatial relationship perception model may learn complex relationships and spatial features between the sample nodes better, and an effect of a trained target spatial relationship perception model is better.

Figure 6:
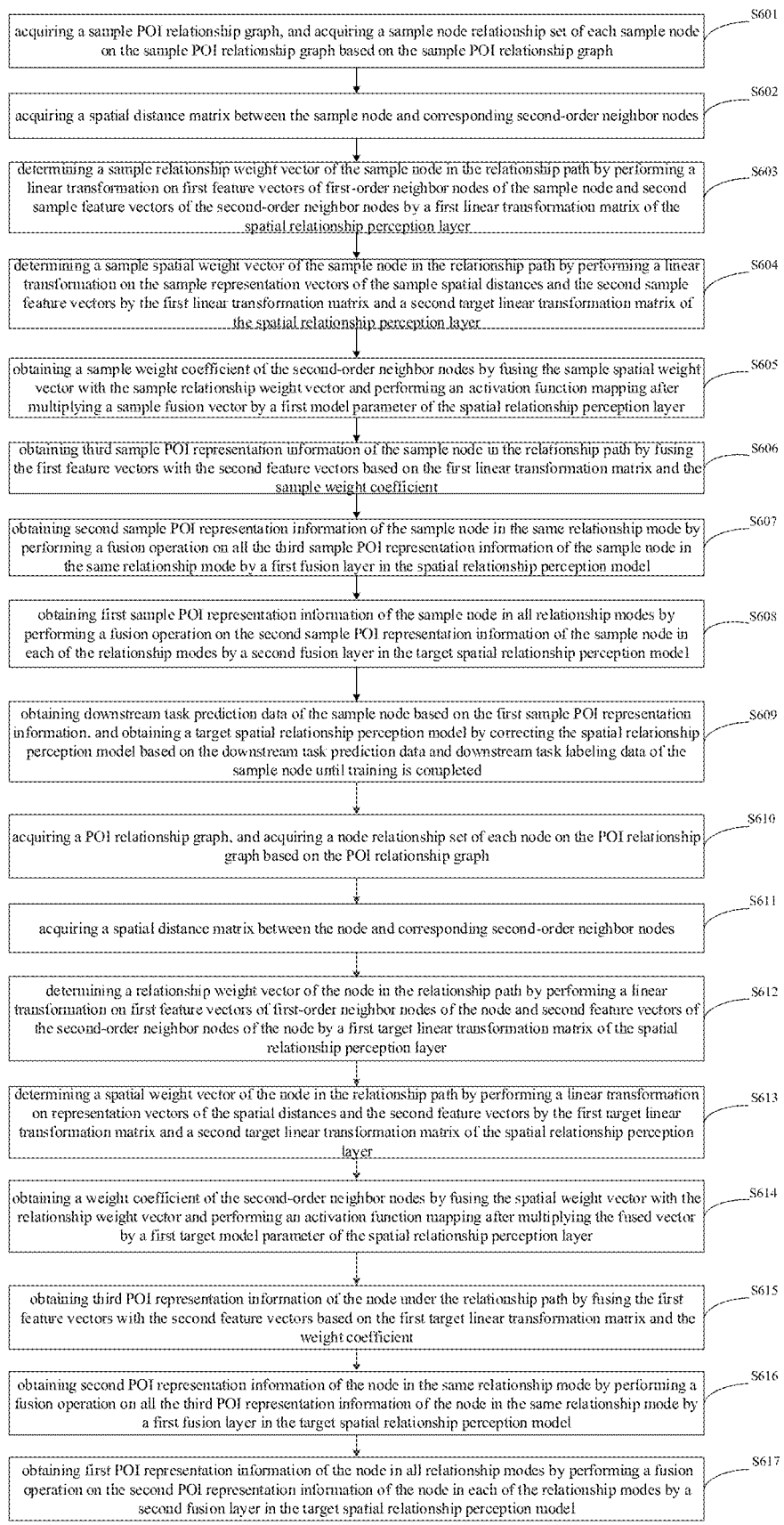
FIG. 6 is a diagram illustrating another method for acquiring point of interest (POI) representation information provided in embodiments of the disclosure.

FIG. 6 is a diagram illustrating a method for acquiring point of interest (POI) representation information provided in embodiments of the present disclosure. As illustrated in FIG. 6, the method includes but not limited to the following steps.

At S601, a sample POI relationship graph is acquired, and a sample node relationship set of each sample node on the sample POI relationship graph is acquired based on the sample POI relationship graph.

The sample POI relationship graph includes edges representing relationships between sample nodes of the POIs, and the sample node relationship set includes relationship paths where the sample node reaches all second-order neighbor nodes via any one first-order neighbor node.

In the embodiments of the present disclosure, an implementation of step S601 may be achieved in any one way of embodiments of the present disclosure, which is not limited here nor repeated here.

At S602, a sample spatial distance matrix between the sample node and corresponding second-order neighbor nodes is acquired.

In the embodiments of the present disclosure, an implementation of step S602 may be achieved in any one way of embodiments of the present disclosure, which is not limited here nor repeated here.

At S603, a sample relationship weight vector of the sample node in the relationship path is determined by performing a linear transformation on first feature vectors of first-order neighbor nodes of the sample node and second sample feature vectors of the second-order neighbor nodes by a first linear transformation matrix of the spatial relationship perception layer.

In the embodiments of the present disclosure, an implementation of step S603 may be achieved in any one way of embodiments of the present disclosure, which is not limited here nor repeated here.

At S604, a sample spatial weight vector of the sample node in the relationship path is determined by performing a linear transformation on the sample representation vectors of the sample spatial distances and the second sample feature vectors by the first linear transformation matrix and a second target linear transformation matrix of the spatial relationship perception layer.

In the embodiments of the present disclosure, an implementation of step S604 may be achieved in any one way of embodiments of the present disclosure, which is not limited here nor repeated here.

At S605, a sample weight coefficient of the second-order neighbor nodes is obtained by fusing the sample spatial weight vector with the sample relationship weight vector and performing an activation function mapping after multiplying a sample fusion vector by a first model parameter of the spatial relationship perception layer.

In the embodiments of the present disclosure, an implementation of step S605 may be achieved in any one way of embodiments of the present disclosure, which is not limited here nor repeated here.

At S606, third sample POI representation information of the sample node in the relationship path is obtained by fusing the first feature vectors with the second feature vectors based on the first linear transformation matrix and the sample weight coefficient.

In the embodiments of the present disclosure, an implementation of step S606 may be achieved in any one way of embodiments of the present disclosure, which is not limited here nor repeated here.

At S607, second sample POI representation information of the sample node in the same relationship mode is obtained by performing a fusion operation on all the third sample POI representation information of the sample node in the same relationship mode by a first fusion layer in the spatial relationship perception model.

In the embodiments of the present disclosure, an implementation of step S607 may be achieved in any one way of embodiments of the present disclosure, which is not limited here nor repeated here.

At S608, first sample POI representation information of the sample node in all relationship modes is obtained by performing a fusion operation on the second sample POI representation information of the sample node in each of the relationship modes by a second fusion layer in the target spatial relationship perception model.

In the embodiments of the present disclosure, an implementation of step S608 may be achieved in any one way of embodiments of the present disclosure, which is not limited here nor repeated here.

At S609, downstream task prediction data of the sample node is obtained based on the first sample POI representation information, and a target spatial relationship perception model is obtained by correcting the spatial relationship perception model based on the downstream task prediction data and downstream task labeling data of the sample node until training is completed.

In the embodiments of the present disclosure, an implementation of step S609 may be achieved in any one way of embodiments of the present disclosure, which is not limited here nor repeated here.

At S610, a POI relationship graph is acquired, and a node relationship set of each node on the POI relationship graph is acquired based on the POI relationship graph.

The POI relationship graph includes edges representing relationships between nodes of POIs, and the node relationship set includes relationship paths where the node reaches all second-order neighbor nodes via any one first-order neighbor node.

In the embodiments of the present disclosure, an implementation of step S610 may be achieved in any one way of embodiments of the present disclosure, which is not limited here nor repeated here.

At S611, a spatial distance matrix between the node and corresponding second-order neighbor nodes is acquired.

In the embodiments of the present disclosure, an implementation of step S611 may be achieved in any one way of embodiments of the present disclosure, which is not limited here nor repeated here.

At S612, a relationship weight vector of the node in the relationship path is determined by performing a linear transformation on first feature vectors of first-order neighbor nodes of the node and second feature vectors of the second-order neighbor nodes of the node by a first target linear transformation matrix of the spatial relationship perception layer.

In the embodiments of the present disclosure, an implementation of step S612 may be achieved in any one way of embodiments of the present disclosure, which is not limited here nor repeated here.

At S613, a spatial weight vector of the node in the relationship path is determined by performing a linear transformation on representation vectors of the spatial distances and the second feature vectors by the first target linear transformation matrix and a second target linear transformation matrix of the spatial relationship perception layer.

In the embodiments of the present disclosure, an implementation of step S613 may be achieved in any one way of embodiments of the present disclosure, which is not limited here nor repeated here.

At S614, a weight coefficient of the second-order neighbor nodes is obtained by fusing the spatial weight vector with the relationship weight vector and performing an activation function mapping after multiplying the fused vector by a first target model parameter of the spatial relationship perception layer.

In the embodiments of the present disclosure, an implementation of step S614 may be achieved in any one way of embodiments of the present disclosure, which is not limited here nor repeated here.

At S615, third POI representation information of the node in the relationship path is obtained by fusing the first feature vectors with the second feature vectors based on the first target linear transformation matrix and the weight coefficient.

In the embodiments of the present disclosure, an implementation of step S615 may be achieved in any one way of embodiments of the present disclosure, which is not limited here nor repeated here.

At S616, second POI representation information of the node in the same relationship mode is obtained by performing a fusion operation on all the third POI representation information of the node in the same relationship mode by a first fusion layer in the target spatial relationship perception model.

In the embodiments of the present disclosure, an implementation of step S616 may be achieved in any one way of embodiments of the present disclosure, which is not limited here nor repeated here.

At S617, first POI representation information of the node in all relationship modes is obtained by performing a fusion operation on the second POI representation information of the node in each of the relationship modes by a second fusion layer in the target spatial relationship perception model.

In the embodiments of the present disclosure, an implementation of step S617 may be achieved in any one way of embodiments of the present disclosure, which is not limited here nor repeated here.

In the embodiments of the disclosure, the first sample POI representation information is acquired based on the relationship information and the spatial feature information in the sample POI relationship graph, to train the spatial relationship perception model, so that the spatial relationship perception model can better learn complex relationships and spatial features between the nodes; in actual applications, a node relationship set in the POI relationship graph and a spatial distance matrix are acquired, and the node relationship set and the spatial distance matrix are input into a pre-trained target spatial relationship perception model, to obtain more accurate first POI representation information; and in an acquisition process of the first POI representation information, the second POI representation information is obtained by fusing the third POI representation information in the same relationship mode, and the second POI representation information in each relationship mode is fused again to obtain the final first POI representation information. Therefore, the second-order neighborhood information of the node is mined more comprehensively, the relationship information and spatial feature information are retained, and the first POI representation information of the node in all relationship modes is more accurate.

On the basis of the above embodiments, the embodiments of the disclosure are applicable to a POI recommendation scenario, to acquire each POI node to be recommended; first POI representation information of the POI node to be recommended is determined by using a target spatial relationship perception model based on complex relationship information and spatial distance information between the POI node and a second-order neighborhood range; the first representation information of the POI node to be recommended is input into a recommendation model of a downstream task, and a scored is given by the recommendation model based on the first representation information of the POI node, in which the score of the POI node to be recommended may be considered as a score that the POI node to be recommended should be recommended, and the greater the score of the POI node to be recommended, the more the POI node to be recommended should be recommended. For example, scores of all the POI nodes to be recommended may be ranked from large to small, and top K POI nodes to be recommended are taken as recommended POIs.

On the basis of the above embodiment, the embodiments of the disclosure are applicable to recognition of a competitive relationship between POI nodes. When the first POI representation information of each POI node is obtained, the first POI representation information of the POI node is input into a competitive relationship recognition model of a downstream task, the competitive relationship recognition model analyzes the first POI representation information of the node, and outputs a relationship result. The relationship result may be different values. For example, if the relationship result is 1, the relationship may be a competitive relationship; if the relationship result is 0, the relationship may be a complementary relationship; if the relationship result is 2, the relationship may be a dependency relationship.

Figure 7:
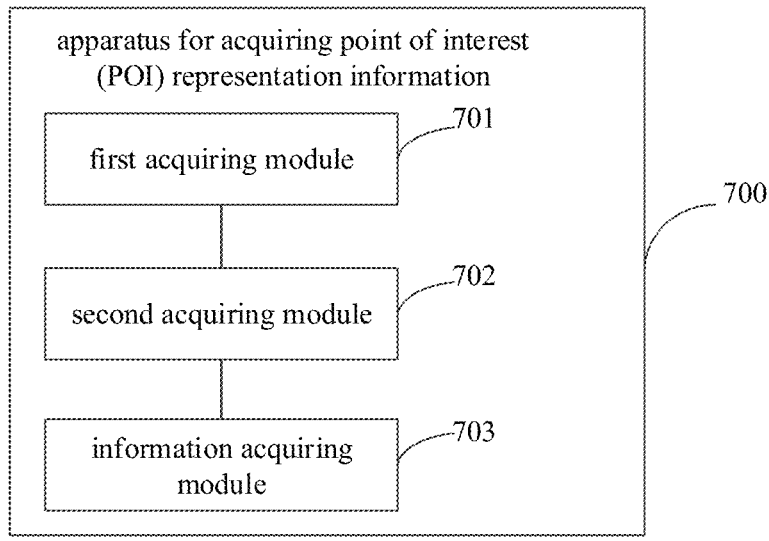
FIG. 7 is a block diagram illustrating an apparatus for acquiring point of interest (POI) representation information provided in embodiments of the present disclosure.

FIG. 7 is a block diagram illustrating an apparatus for acquiring point of interest (POI) representation information provided in embodiments of the present disclosure. As illustrated in FIG. 7, the apparatus 700 for acquiring point of interest (POI) representation information includes a first acquiring module 701, a second acquiring module 702 and an information acquiring module 703.

The first acquiring module 701 is configured to acquire a POI relationship graph, and acquire a node relationship set of each node on the POI relationship graph based on the POI relationship graph. The POI relationship graph includes edges representing relationships between nodes of POIs, and the node relationship set includes relationship paths where the node reaches all second-order neighbor nodes via any one first-order neighbor node.

The second acquiring module 702 is configured to acquire a spatial distance matrix between the node and corresponding second-order neighbor nodes.

The information acquiring module 703 is configured to determine first POI representation information of the node based on the node relationship set of the node and the spatial distance matrix.

In some implementations, the information acquiring module 703 is further configured to: determine relationship subsets of the node in different relationship modes from the node relationship set, and the relationship subset includes at least one of the relationship paths of the node in the same relationship mode; determine, for each of the relationship modes, second POI representation information of the node in the relationship mode based on relationship paths in the relationship subset and the spatial distance matrix; and obtain the first POI representation information of the node in all relationship modes by performing a fusion operation on the second POI representation information of the node in each of the relationship modes.

In some implementations, the information acquiring module 703 is further configured to: determine, for each relationship path in the relationship subset corresponding to the same relationship mode, spatial distances between the node and the second-order neighbor nodes in the relationship path based on the spatial distance matrix; determine third POI representation information of the node in the relationship path based on the spatial distances and first-order neighbor nodes and second-order neighbor nodes of the nodes in the relationship path; and obtain the second POI representation information of the node in the same relationship mode by performing a fusion operation on all the third POI representation information of the node in the same relationship mode.

In some implementations, the information acquiring module 703 is further configured to: determine a relationship weight vector of the node in the relationship path based on the first-order neighbor nodes and the second-order neighbor nodes; determine a spatial weight vector of the node in the relationship path based on the spatial distances and the second-order neighbor nodes; obtain a weight coefficient of the second-order neighbor nodes by fusing the spatial weight vector with the relationship weight vector; and obtain the third POI representation information of the node in the relationship path based on the first-order neighbor nodes, the second-order neighbor nodes and the weight coefficient.

In some implementations, the information acquiring module 703 is further configured to: determine first feature vectors of the first-order neighbor nodes and second feature vectors of the second-order neighbor nodes of the node in the relationship path; and determine the relationship weight vector corresponding to the node by performing a linear transformation on the first feature vectors and the second feature vectors.

In some implementations, the information acquiring module 703 is further configured to: determine representation vectors of the spatial distances and second feature vectors of the second-order neighbor nodes; and determine the spatial weight vector corresponding to the node by performing a linear transformation on the representation vectors of the spatial distances and the second feature vectors.

In some implementations, the information acquiring module 703 is further configured to: acquire a pre-trained target spatial relationship perception model; input each relationship path in a relationship subset corresponding to the same relationship mode and the spatial distances between the node and the second-order neighbor nodes in the relationship path into the target spatial relationship perception model, and output third POI representation information of the node in the relationship path by a spatial relationship perception layer in the target spatial relationship perception model; obtain second POI representation information of the node in the same relationship mode by performing a fusion operation on all the third POI representation information of the node in the same relationship mode by a first fusion layer in the target spatial relationship perception model; and obtain first POI representation information of the node in all relationship modes by performing a fusion operation on the second POI representation information of the node in each of the relationship modes by a second fusion layer in the target spatial relationship perception model.

In some implementations, the information acquiring module 703 is further configured to: determine a relationship weight vector of the node in the relationship path by performing a linear transformation on first feature vectors of first-order neighbor nodes of the node and second feature vectors of the second-order neighbor nodes of the node by a first target linear transformation matrix of the spatial relationship perception layer; determine a spatial weight vector of the node in the relationship path by performing a linear transformation on representation vectors of the spatial distances and the second feature vectors by the first target linear transformation matrix and a second target linear transformation matrix of the spatial relationship perception layer; obtain a weight coefficient of the second-order neighbor nodes by fusing the spatial weight vector with the relationship weight vector and performing an activation function mapping after multiplying the fused vector by a first target model parameter of the spatial relationship perception layer; and obtain the third POI representation information of the node in the relationship path by fusing the first feature vectors with the second feature vectors based on the first target linear transformation matrix and the weight coefficient.

In some implementations, the information acquiring module 703 is further configured to: obtain a first transformation result by performing a linear transformation on the first feature vectors based on the first target linear transformation matrix; obtain weighted second feature vectors by weighting the second feature vectors and the weight coefficient, and obtain a second transformation result by performing a linear transformation on the weighted second feature vectors based on the first target linear transformation matrix; and obtain the third POI representation information of the node in the relationship path by adding the first transformation result and the second transformation result together.

In some implementations, the first acquiring module 701 is further configured to: for any one candidate second-order neighbor node vk of the node vi, acquire a path number of relationship paths where the node vi reaches the node vk via any one first-order neighbor node vj based on the POI relationship graph; determine, from all candidate second-order neighbor nodes of the node vi, one or more candidate second-order neighbor nodes with the path number greater than a set number as target second-order neighbor nodes of the node for reservation; and acquire the node relationship set of the node by mining relationship paths between the node and the target second-order neighbor nodes.

In some implementations, the second acquiring module 702 is further configured to: acquire, for any one second-order neighbor node of the node, first spatial coordinate information of the node and second spatial coordinate information of the second-order neighbor node; acquire a spatial distance between the node and the second-order neighbor node by performing an Euclidean distance operation based on the first spatial coordinate information and the second spatial coordinate information; and acquire the spatial distance matrix based on the spatial distance between the node and each of the second-order neighbor nodes.

In some implementations, the information acquiring module 703 is further configured to: obtain a processing result of a downstream task by performing a downstream task processing on the node based on the first POI representation information of the node.

In the embodiments of the disclosure, a POI relationship graph and a node relationship set in the POI relationship graph are obtained, and the node relationship set includes all complex relationships between the nodes; a spatial distance matrix is determined based on spatial positions of the nodes, and the spatial distance matrix reflects spatial feature information between the nodes; the first POI representation information is determined based on the node relationship set and the spatial distance matrix, which fully mines relationship information and spatial information in a second-order neighborhood of the nodes, and the obtained first POI representation information is more accurate and representative.

Figure 8:
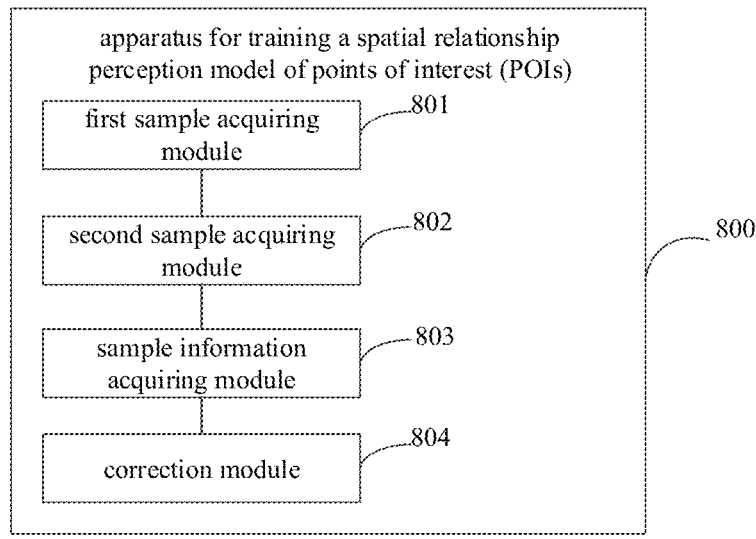
FIG. 8 is a block diagram illustrating an apparatus for training a spatial relationship perception model for points of interest (POIs) provided in embodiments of the present disclosure.

FIG. 8 is a block diagram illustrating a structure of an apparatus for training a spatial relationship perception model for points of interest (POIs) provided in embodiments of the present disclosure. As illustrated in FIG. 8, the apparatus 800 for training a spatial relationship perception model for points of interest (POIs) includes a first sample acquiring module 801, a second sample acquiring module 802, a sample information acquiring module 803 and a correction module 804.

The first sample acquiring module 801 is configured to acquire a sample POI relationship graph, and acquire a sample node relationship set of each sample node on the sample POI relationship graph based on the sample POI relationship graph. The sample POI relationship graph includes edges representing relationships between sample nodes of the POIs, and the sample node relationship set includes relationship paths where the sample node reaches all second-order neighbor nodes via any one first-order neighbor node.

The second sample acquiring module 802 is configured to acquire a sample spatial distance matrix between the sample node and corresponding second-order neighbor nodes.

The sample information acquiring module 803 is configured to determine first sample POI representation information of the sample node by training an initial spatial relationship perception model based on the sample node relationship set of the sample node and the sample spatial distance matrix.

The correction module 804 is configured to obtain downstream task prediction data of the sample node based on the first sample POI representation information, and obtain a target spatial relationship perception model by correcting the spatial relationship perception model based on the downstream task prediction data and downstream task labeling data of the sample node until training is completed.

In some implementations, the sample information acquiring module 803 is further configured to: input each relationship path in a relationship subset corresponding to the same relationship mode and sample spatial distances between the sample node and the second-order neighbor nodes in the relationship path into the spatial relationship perception model, and output third sample POI representation information of the sample node in the relationship path by a spatial relationship perception layer in the sample spatial relationship perception model; obtain second sample POI representation information of the sample node in the same relationship mode by performing a fusion operation on all the third sample POI representation information of the sample node in the same relationship mode by a first fusion layer in the spatial relationship perception model; and obtain first sample POI representation information of the sample node in all relationship modes by performing a fusion operation on the second sample POI representation information of the sample node in each of the relationship modes by a second fusion layer in the target spatial relationship perception model.

In some implementations, the sample information acquiring module 803 is further configured to: determine a sample relationship weight vector of the sample node in the relationship path by performing a linear transformation on first feature vectors of first-order neighbor nodes of the sample nodes and second sample feature vectors of the second-order neighbor nodes by a first linear transformation matrix of the spatial relationship perception layer; determine a sample spatial weight vector of the sample node in the relationship path by performing a linear transformation on sample representation vector of the sample spatial distance and the second sample feature vectors by the first linear transformation matrix and a second target linear transformation matrix of the spatial relationship perception layer; obtain a sample weight coefficient of the second-order neighbor nodes by fusing the sample spatial weight vector with the sample relationship weight vector and performing an activation function mapping after multiplying a sample fusion vector by a first model parameter of the spatial relationship perception layer; and obtain third sample POI representation information of the sample node in the relationship path by fusing the first feature vectors with the second feature vectors based on the first linear transformation matrix and the sample weight coefficient.

In some implementations, the sample information acquiring module 803 is further configured to: obtain a first transformation result by performing a linear transformation on the first sample feature vector based on the first linear transformation matrix; obtain weighted second sample feature vectors by weighting the second sample feature vectors and the sample weight coefficient, and obtain a second transformation result by performing a linear transformation on the weighted second sample feature vectors based on the first linear transformation matrix; and obtain the third sample POI representation information of the sample node in the relationship path by adding the first transformation result and the second transformation result together.

In some implementations, the correction module 804 is further configured to: determine a loss function of the spatial relationship perception model based on the downstream task prediction data and the downstream task labeling data of the sample node; and obtain the target spatial relationship perception model by correcting the first linear transformation matrix, the second linear transformation matrix and the first model parameter in the spatial relationship perception model based on the loss function, returning to a next sample to continue training the corrected spatial relationship perception model until training is completed. The target spatial relationship perception model includes a first target linear transformation matrix, a second target linear transformation matrix and a first target model parameter.

In the embodiments of the disclosure, a sample node relationship set is acquired by acquiring the sample POI relationship graph; first sample POI representation information is acquired based on relationship paths in the sample node relationship set and spatial distances between the sample nodes, downstream task prediction data are acquired based on the first sample POI representation information, a loss function is acquired based on the downstream task prediction data and actual downstream task labeling data, and a first linear transformation matrix, a second linear transformation matrix and a first model parameter in the spatial relationship perception model are continuously corrected based on the loss function, so that the loss function of the spatial relationship perception model converges; the spatial relationship perception model is trained based on relationship information and spatial information in the actual sample POI relationship graph. Therefore the spatial relationship perception model can better learn complex relationships and spatial features between the sample nodes, and the effect of a trained target spatial relationship perception model is better.

In the technical solution of the present disclosure, acquisition, storage and application of user personal information involved in the present disclosure conform to the provisions of relevant legal regulations, and do not violate the public-order yield.

An electronic device, a readable storage medium and a computer program product are further provided according to embodiments of the present disclosure.

Figure 9:
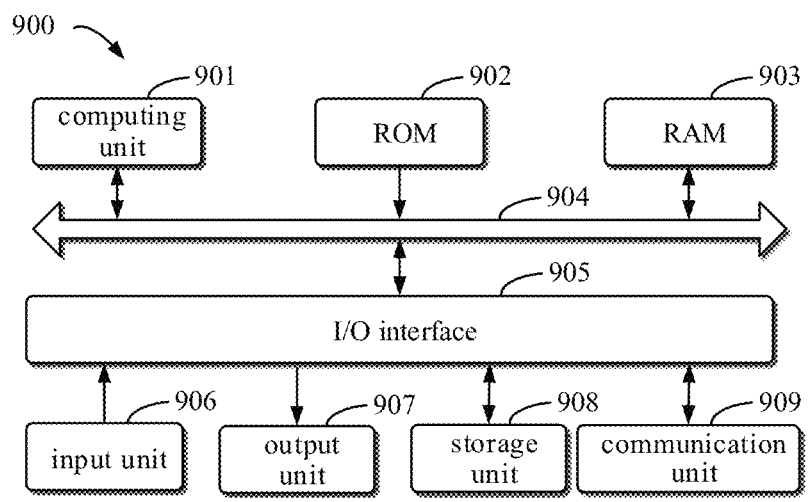
FIG. 9 is a block diagram illustrating an electronic device configured to implement a method for acquiring point of interest (POI) representation information or a method for training a spatial relationship perception model for points of interest (POIs) provided in embodiments of the present disclosure.

FIG. 9 is a schematic block diagram illustrating an electronic device 900 in embodiments of the present disclosure. The electronic device is intended to represent various types of digital computers, such as laptop computers, desktop computers, workstations, personal digital assistants, servers, blade servers, mainframe computers, and other suitable computers. The electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 9, a device 900 includes a computing unit 901, configured to execute various appropriate actions and processes according to a computer program stored in a read-only memory (ROM) 902 or loaded from a storage unit 908 to a random access memory (RAM) 903. In the RAM 903, various programs and data required for the device 900 may be stored. The computing unit 901, the ROM 902 and the RAM 903 may be connected with each other by a bus 904. An input/output (I/O) interface 905 is also connected to the bus 904.

A plurality of components in the device 900 are connected to an I/O interface 905, and includes: an input unit 906, for example, a keyboard, a mouse; an output unit 907, for example, various types of displays, speakers; a storage unit 908, for example, a magnetic disk, an optical disk; and a communication unit 909, for example, a network card, a modem, a wireless transceiver. The communication unit 909 allows the device 900 to exchange information/data through a computer network such as internet and/or various types of telecommunication networks and other devices.

The computing unit 901 may be various types of general and/or dedicated processing components with processing and computing ability. Some examples of the computing unit 901 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 901 executes various methods and processing as described above, for example, a method for acquiring point of interest (POI) representation information and a method for training a spatial relationship perception model for points of interest (POIs). For example, in some embodiments, the method for acquiring point of interest (POI) representation information and the method for training a spatial relationship perception model for points of interest (POIs) may be further implemented as a computer software program, which is physically contained in a machine-readable medium, such as the storage unit 908. In some embodiments, a part or all of the computer program may be loaded and/or installed on the device 900 via the ROM 902 and/or the communication unit 909. When the computer program is loaded on the RAM 903 and executed by the computing unit 901, one or more steps in the method for acquiring point of interest (POI) representation information and the method for training a spatial relationship perception model for points of interest (POIs) may be performed. Alternatively, in other embodiments, the computing unit 901 may be configured to perform method for acquiring point of interest (POI) representation information in other appropriate ways (for example, by virtue of a firmware).

Various implementation modes of systems and technologies described herein may be implemented in a digital electronic circuit system, an integrated circuit system, a field programmable gate array (FPGA), a dedicated application specific integrated circuit (ASIC), a system on a chip (SOC), a load programmable logic device (CPLD), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of multiple programming languages. These programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be executed completely or partly on the machine, executed partly on the machine as an independent software package and executed partly or completely on the remote machine or server.

In the context of the present disclosure, a machine-readable medium may be a tangible medium that may contain or store a program intended for use in or in conjunction with an instruction execution system, apparatus, or device. A machine-readable medium may be a machine readable signal medium or a machine readable storage medium. The machine-readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an EPROM programmable read-only ROM (an EPROM or a flash memory), an optical fiber device, and a portable optical disk read-only memory (CDROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a speech input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), and an internet.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, and further may be a server with a distributed system, or a server in combination with a blockchain.

It should be understood that, various forms of procedures shown above may be configured to reorder, add or delete blocks. For example, blocks described in the present disclosure may be executed in parallel, sequentially, or in a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. A method for acquiring representation information of point of interest (POI) within a map displayed at a user computer, comprising:
    acquiring a POI relationship graph, and acquiring a node relationship set of each node on the POI relationship graph based on the POI relationship graph, wherein the POI relationship graph comprises edges representing relationships between nodes of a plurality of POIs represented by the graph, and the node relationship set comprises relationship paths where the node reaches all second-order neighbor nodes via any one first-order neighbor node;
    acquiring a spatial distance matrix between the node and corresponding second-order neighbor nodes;
    determining first POI representation information of the node based on the node relationship set of the node and the spatial distance matrix; and
    obtaining a processing result of an autonomous driving task by performing an autonomous driving task processing on the node based on the first POI representation information of the node;
    wherein in a case that a number of times for which the nodes of a plurality of the POIs represented by the graph are continuously accessed by a user exceeds a certain number, there is a relationship between the nodes of a plurality of the POIs represented by the graph;
    wherein determining the first POI representation information of the node based on the node relationship set of the node and the spatial distance matrix, comprises:
    acquiring a pre-trained target spatial relationship perception model;

inputting each relationship path in a relationship subset corresponding to a same relationship mode and spatial distances between the node and the second-order neighbor nodes in the relationship path into the target spatial relationship perception model, and outputting third POI representation information of the node in the relationship path by a spatial relationship perception layer in the target spatial relationship perception model;

obtaining second POI representation information of the node in the same relationship mode by performing a fusion operation on all the third POI representation information of the node in the same relationship mode by a first fusion layer in the target spatial relationship perception model; and obtaining first POI representation information of the node in all relationship modes by performing a fusion operation on the second POI representation information of the node in each of the relationship modes by a second fusion layer in the target spatial relationship perception model;

wherein the target spatial relationship perception model is a graph neural network.

2. The method according to claim 1, wherein determining the POI representation information of the node based on the node relationship set of the node and the spatial distance matrix, comprises:

determining relationship subsets of the node in different relationship modes from the node relationship set, wherein the relationship subset comprises at least one of the relationship paths of the node in a same relationship mode;

determining, for each of the relationship modes, second POI representation information of the node in the relationship mode based on relationship paths in the relationship subset and the spatial distance matrix; and obtaining the first POI representation information of the node in all relationship modes by performing a fusion operation on the second POI representation information of the node in each of the relationship modes.

3. The method according to claim 2, wherein determining the second POI representation information of the node in the relationship mode based on the relationship paths in the relationship subset and the spatial distance matrix, comprises:

determining, for each of the relationship paths in the relationship subset corresponding to the same relationship mode, spatial distances between the node and the second-order neighbor nodes in the relationship path based on the spatial distance matrix;

determining third POI representation information of the node in the relationship path based on the spatial distances and the first-order neighbor nodes and the second-order neighbor nodes of the node in the relationship path; and obtaining the second POI representation information of the node in the same relationship mode by performing a fusion operation on all the third POI representation information of the node in the same relationship mode.

4. The method according to claim 3, wherein determining the third POI representation information of the node in the relationship path based on the spatial distances and the first-order neighbor nodes and the second-order neighbor nodes of the node in the relationship path, comprises:

determining a relationship weight vector of the node in the relationship path based on the first-order neighbor nodes and the second-order neighbor nodes; and determining a spatial weight vector of the node in the relationship path based on the spatial distances and the second-order neighbor nodes;

obtaining a weight coefficient of the second-order neighbor nodes by fusing the spatial weight vector with the relationship weight vector; and obtaining the third POI representation information of the node in the relationship path based on the first-order neighbor nodes, the second-order neighbor nodes and the weight coefficient.

5. The method according to claim 4, wherein determining the relationship weight vector of the node in the relationship path based on the first-order neighbor nodes and the second-order neighbor nodes, comprises:

determining first feature vectors of the first-order neighbor nodes and second feature vectors of the second-order neighbor nodes of the node in the relationship path; and determining the relationship weight vector corresponding to the node by performing a linear transformation on the first feature vectors and the second feature vectors.

6. The method according to claim 4, wherein determining the spatial weight vector of the node in the relationship path based on the spatial distances and the second-order neighbor nodes, comprises:

determining representation vectors of the spatial distances and second feature vectors of the second-order neighbor nodes; and determining the spatial weight vector corresponding to the node by performing a linear transformation on the representation vectors of the spatial distances and the second feature vectors.

7. The method according to claim 1, wherein inputting each relationship path in the relationship subset corresponding to the same relationship mode and the spatial distances between the node and the second-order neighbor nodes in the relationship path into the target spatial relationship perception model, and outputting the third POI representation information of the node in the relationship path, comprises:

determining a relationship weight vector of the node in the relationship path by performing a linear transformation on first feature vectors of first-order neighbor nodes of the node and second feature vectors of the second-order neighbor nodes of the node by a first target linear transformation matrix of the spatial relationship perception layer;

determining a spatial weight vector of the node in the relationship path by performing a linear transformation on representation vectors of the spatial distances and the second feature vectors by the first target linear transformation matrix and a second target linear transformation matrix of the spatial relationship perception layer;

obtaining a weight coefficient of the second-order neighbor nodes by fusing the spatial weight vector with the relationship weight vector and performing an activation function mapping after multiplying the fused vector by a first target model parameter of the spatial relationship perception layer; and obtaining the third POI representation information of the node in the relationship path by fusing the first feature vectors with the second feature vectors based on the first target linear transformation matrix and the weight coefficient.

8. The method according to claim 7, wherein obtaining the third POI representation information of the node in the relationship path by fusing the first feature vectors with the second feature vectors based on the first target linear transformation matrix and the weight coefficient, comprises:
  obtaining a first transformation result by performing a linear transformation on the first feature vectors based on the first target linear transformation matrix;
  obtaining weighted second feature vectors by weighting the second feature vectors and the weight coefficient, and obtaining a second transformation result by performing a linear transformation on the weighted second feature vectors based on the first target linear transformation matrix; and
  obtaining the third POI representation information of the node in the relationship path by adding the first transformation result and the second transformation result together.

9. The method according to claim 1, wherein acquiring the node relationship set of each node on the POI relationship graph based on the POI relationship graph, comprises:
  for any one candidate second-order neighbor node $v_k$ of a node $v_i$, acquiring a path number of relationship paths where the node $v_i$ reaches the node $v_k$ via any one first-order neighbor node $v_j$ based on the POI relationship graph;
  determining, from all candidate second-order neighbor nodes of the node vi, one or more candidate second-order neighbor nodes with the path number greater than a set number as target second-order neighbor nodes of the node for retention; and
  acquiring the node relationship set of the node by mining relationship paths between the node and the target second-order neighbor nodes.

10. The method according to claim 1, wherein acquiring the spatial distance matrix between the node and the corresponding second-order neighbor nodes, comprises:
  acquiring, for any one second-order neighbor node of the node, first spatial coordinate information of the node and second spatial coordinate information of the second-order neighbor node;
  acquiring a spatial distance between the node and the second-order neighbor node by performing an Euclidean distance operation on the first spatial coordinate information and the second spatial coordinate information; and
  acquiring the spatial distance matrix based on the spatial distance between the node and each of the second-order neighbor nodes.

11. A device for acquiring representation information of point of interest (POI) within a map displayed at a user computer, comprising:
  at least one processor; and
  a memory communicatively connected to the at least one processor and stored with instructions executable by the at least one processor,
  wherein the at least one processor is configured to:
  acquire a POI relationship graph, and acquire a node relationship set of each node on the POI relationship graph based on the POI relationship graph, wherein the POI relationship graph comprises edges representing relationships between nodes of a plurality of POIs represented by the graph, and the node relationship set comprises relationship paths where the node reaches all second-order neighbor nodes via any one first-order neighbor node;
  acquire a spatial distance matrix between the node and corresponding second-order neighbor nodes;
  determine first POI representation information of the node based on the node relationship set of the node and the spatial distance matrix; and
  obtain a processing result of an autonomous driving task by performing an autonomous driving task processing on the node based on the first POI representation information of the node;
  wherein in a case that a number of times for which the nodes of a plurality of the POIs represented by the graph are continuously accessed by a user exceeds a certain number, there is a relationship between the nodes of a plurality of the POIs represented by the graph;
  wherein the at least one processor is configured to determine the first POI representation information of the node based on the node relationship set of the node and the spatial distance matrix by:
  acquiring a pre-trained target spatial relationship perception model;
  inputting each relationship path in a relationship subset corresponding to a same relationship mode and spatial distances between the node and the second-order neighbor nodes in the relationship path into the target spatial relationship perception model, and outputting third POI representation information of the node in the relationship path by a spatial relationship perception layer in the target spatial relationship perception model;
  obtaining second POI representation information of the node in the same relationship mode by performing a fusion operation on all the third POI representation information of the node in the same relationship mode by a first fusion layer in the target spatial relationship perception model: and
  obtaining first POI representation information of the node in all relationship modes by performing a fusion operation on the second POI representation information of the node in each of the relationship modes by a second fusion layer in the target spatial relationship perception model;
  wherein the target spatial relationship perception model is a graph neural network.

12. The device according to claim 11, wherein the at least one processor is further configured to:
  determine relationship subsets of the node in different relationship modes from the node relationship set, wherein the relationship subset comprises at least one of the relationship paths of the node in a same relationship mode;
  determine, for each of the relationship modes, second POI representation information of the node in the relationship mode based on relationship paths in the relationship subset and the spatial distance matrix; and
  obtain the first POI representation information of the node in all relationship modes by performing a fusion operation on the second POI representation information of the node in each of the relationship modes.

* * * * *